US011012272B2

(12) United States Patent
Gaal et al.

(10) Patent No.: US 11,012,272 B2
(45) Date of Patent: May 18, 2021

(54) CHANNEL OR INTERFERENCE ESTIMATION FOR SC-FDM SYMBOL STREAMS

(71) Applicant: QUALCOMM Incorporated, San Diego, CA (US)

(72) Inventors: Peter Gaal, San Diego, CA (US); Wanshi Chen, San Diego, CA (US); Hao Xu, San Diego, CA (US); Tao Luo, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/065,272

(22) Filed: Mar. 9, 2016

(65) Prior Publication Data

US 2016/0269207 A1    Sep. 15, 2016

Related U.S. Application Data

(60) Provisional application No. 62/131,081, filed on Mar. 10, 2015.

(51) Int. Cl.
*H04L 27/12* (2006.01)
*H04L 27/26* (2006.01)
(Continued)

(52) U.S. Cl.
CPC .......... *H04L 27/122* (2013.01); *H04L 5/0048* (2013.01); *H04L 25/0224* (2013.01); *H04L 27/2613* (2013.01); *H04L 27/2636* (2013.01)

(58) Field of Classification Search
CPC ... H04L 5/0051; H04L 27/122; H04L 5/0048; H04L 25/0224; H04L 27/2613;
(Continued)

(56) References Cited

U.S. PATENT DOCUMENTS 7,046,726 B2 * 5/2006 Jayaraman ........ H04L 25/03057
375/222
2004/0005010 A1    1/2004 He et al.
(Continued)

FOREIGN PATENT DOCUMENTS

CN       1346559 A    4/2002
CN     101145833 A    3/2008
(Continued)

OTHER PUBLICATIONS

LTE Quick Reference, Jul. 13, 2012 (Year: 2012).*
(Continued)

*Primary Examiner* — Sophia Vlahos
(74) *Attorney, Agent, or Firm* — Liem T. Do

(57) ABSTRACT

Techniques are described for wireless communication. A first method includes inserting channel or interference estimation modulation symbols into a sequence of data modulation symbols; performing a discrete Fourier transform (DFT) on a group of modulation symbols in the sequence of data modulation symbols, the group of modulation symbols including at least one of the channel or interference estimation modulation symbols; and generating a single-carrier frequency domain modulated (SC-FDM) symbol stream based at least in part on an output of the DFT. A second method includes performing an IDFT on a tone-demapped output of a DFT for each of at least one SC-FDM symbol stream, to recover a plurality of data modulation symbols and channel or interference estimation modulation symbols for each of the at least one SC-FDM symbol stream; estimating interference based at least in part on the channel or interference estimation modulation symbols; and decoding the data modulation symbols based at least in part on the estimated interference.

28 Claims, 13 Drawing Sheets

(51) Int. Cl.
*H04L 5/00* (2006.01)
*H04L 25/02* (2006.01)

(58) Field of Classification Search
CPC ............ H04L 27/2636; H04J 2211/006; H04J 211/008; H04B 7/208
See application file for complete search history.

(56) References Cited

U.S. PATENT DOCUMENTS

| | | | |
|---|---|---|---|
| 2006/0203932 A1* | 9/2006 | Palanki | H04B 1/69 375/295 |
| 2007/0014272 A1* | 1/2007 | Palanki | H04B 7/04 370/344 |
| 2007/0041404 A1* | 2/2007 | Palanki | H04B 1/692 370/479 |
| 2007/0280365 A1* | 12/2007 | Seki | H04L 5/0046 375/260 |
| 2009/0227278 A1* | 9/2009 | Cho | H04L 1/0026 455/522 |
| 2009/0238240 A1 | 9/2009 | Lakkis | |
| 2010/0075693 A1* | 3/2010 | Kishigami | H04B 7/0671 455/452.2 |
| 2012/0020320 A1* | 1/2012 | Issakov | G01S 5/06 370/330 |
| 2013/0223560 A1* | 8/2013 | Nishikawa | H04L 27/2614 375/295 |

FOREIGN PATENT DOCUMENTS

| | | |
|---|---|---|
| CN | 101569121 A | 10/2009 |
| JP | 2005123898 A | 5/2005 |
| JP | 2008193666 A | 8/2008 |
| JP | 2010522491 A | 7/2010 |

OTHER PUBLICATIONS

Garcia et al., "DFT-Based Channel Estimation in 2D-Pilot-Symbol-Aided OFDM Wireless Systems," IEEE VTS 53rd Vehicular Technology Conference, Rhodes, VTC 2001 Spring, May 6-9, 2001, pp. 810-814, vol. 2, ISBN 0-7803-6728-6, Institute of Electrical and Electronics Engineers.

ISA/EP, International Search Report and Written Opinion of the International Searching Authority, Int'l. App. No. PCT/US2016/021769, dated May 30, 2016, European Patent Office, Rijswijk, NL, 11 pgs.

Zeng et al., "Pilot Cyclic Prefixed Single Carrier Communication: Channel Estimation and Equalization," IEEE Signal Processing Letters, Jan. 2005, pp. 56-59, vol. 12, No. 1, ISSN 1070-9908, Institute of Electrical and Electronics Engineers.

Texas Instruments: "Uplink Reference Signals in Support of High-Speed UEs", 3GPP TSG RAN WG1 Meeting #51, R1-074678, Jeju, Korea, Nov. 5-9, 2007, 6 Pages, XP050108154.

* cited by examiner

CHANNEL OR INTERFERENCE ESTIMATION FOR SC-FDM SYMBOL STREAMS

CROSS REFERENCES

The present Application for Patent claims priority to U.S. Provisional Patent Application No. 62/131,081 by Gaal et al., entitled "Interference Estimation for SC-FDM Symbol Streams," filed Mar. 10, 2015, assigned to the assignee hereof, and expressly incorporated by reference herein.

BACKGROUND

1. Field of the Disclosure

The present disclosure, for example, relates to wireless communication systems, and more particularly to techniques for estimating interference associated with single-carrier frequency-division modulated (SC-FDM) symbol streams.

2. Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems (i.e., systems in different devices transmit different SC-FDM symbol streams over different orthogonal resources), and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communication between a base station and a UE over a shared radio frequency spectrum, or over different radio frequency spectrums (e.g., a dedicated radio frequency spectrum and a shared radio frequency spectrum) of a cellular network. With increasing data traffic in cellular networks that use a dedicated (e.g., licensed) radio frequency spectrum, offloading of at least some data traffic to a shared radio frequency spectrum may provide a cellular operator with opportunities for enhanced data transmission capacity. A shared radio frequency spectrum may also provide service in areas where access to a dedicated radio frequency spectrum is unavailable.

SUMMARY

The present disclosure, for example, relates to wireless communication systems, and more particularly to techniques for estimating interference associated with SC-FDM symbol streams. When SC-FDM symbol streams are transmitted between UEs and base stations over a dedicated radio frequency spectrum, the timing and structure (e.g., resource allocation and subframe structure) of transmissions made over the dedicated radio frequency spectrum can be controlled, and steps may be taken to mitigate expected interference between transmissions. However, when SC-FDM symbol streams are transmitted between UEs and base stations over a shared radio frequency spectrum, wireless devices using other types of communication structures (e.g., wireless local area network (WLAN) or Wi-Fi communication structures) may introduce interference of an unknown nature, and it may be beneficial to detect and remove this interference when decoding data included in the SC-FDM symbol streams. In some cases, the interference may be bursty (e.g., intermittent and appearing over short time intervals), making it relatively more difficult to detect and remove.

In a first set of illustrative examples, a method for wireless communication is described. In one configuration, the method may include inserting channel or interference estimation modulation symbols into a sequence of data modulation symbols; performing a discrete Fourier transform (DFT) on a group of modulation symbols in the sequence of data modulation symbols, the group of modulation symbols including at least one of the channel or interference estimation modulation symbols; and generating a SC-FDM symbol stream based at least in part on an output of the DFT.

In some examples of the method, the channel or interference estimation modulation symbols may include at least one of: zero symbols or known non-zero symbols. In some examples, the method may include receiving a channel or interference estimation modulation symbol insertion instruction from a base station, and the channel or interference estimation modulation symbols may be inserted into the sequence of data modulation symbols in accordance with the channel or interference estimation modulation symbol insertion instruction. In some examples, the channel or interference estimation modulation symbol insertion instruction may be received in connection with a transmission grant from the base station. In some examples, the channel or interference estimation modulation symbol insertion instruction may include a semi-static instruction. In some examples, the method may further include identifying a channel or interference estimation modulation symbol insertion policy based at least in part on the channel or interference estimation modulation symbol insertion instruction.

In some examples, the method may include determining a user-specific insertion period offset; and the channel or interference estimation modulation symbols may be inserted into the sequence of data modulation symbols in accordance with the user-specific insertion period offset. In some examples, the channel or interference estimation modulation symbols may have a reduced modulation order with respect to the data modulation symbols. In some examples, each of the channel or interference estimation modulation symbols may span all frequencies within a number of resource blocks allocated for the SC-FDM symbol stream. In some examples, a same number of channel or interference estimation modulation symbols may be included in each SC-FDM symbol of the SC-FDM symbol stream. In some examples, data modulation symbols in the sequence of data modulation symbols may be rate-matched to the channel or interference estimation modulation symbols.

In a second set of illustrative examples, an apparatus for wireless communication is described. In one configuration, the apparatus may include means for inserting channel or interference estimation modulation symbols into a sequence of data modulation symbols; means for performing a DFT on a group of modulation symbols in the sequence of data modulation symbols, the group of modulation symbols including at least one of the channel or interference estimation modulation symbols; and means for generating a SC- FDM symbol stream based at least in part on an output of the DFT. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, memory in electronic communication with the processor, and instructions stored in the memory. The instructions may be executable by the processor to insert channel or interference estimation modulation symbols into a sequence of data modulation symbols; to perform a DFT on a group of modulation symbols in the sequence of data modulation symbols, the group of modulation symbols including at least one of the channel or interference estimation modulation symbols; and to generate a SC-FDM symbol stream based at least in part on an output of the DFT. In some examples, the instructions may also be executable by the processor to implement one or more aspects of the method for wireless communication described above with respect to the first set of illustrative examples.

In a fourth set of illustrative examples, a computer-readable medium for storing instructions executable by a processor is described. In one configuration, the computer-readable medium may include instructions to insert channel or interference estimation modulation symbols into a sequence of data modulation symbols; instructions to perform a DFT on a group of modulation symbols in the sequence of data modulation symbols, the group of modulation symbols including at least one of the channel or interference estimation modulation symbols; and instructions to generate a SC-FDM symbol stream based at least in part on an output of the DFT. In some examples, the computer-readable medium may also include instructions to implement one or more aspects of the method for wireless communication described above with respect to the first set of illustrative examples.

In a fifth set of illustrative examples, another method for wireless communication is described. In one configuration, the method may include performing an inverse DFT (IDFT) on a tone-demapped output of a DFT for each of at least one SC-FDM symbol stream, to recover a plurality of data modulation symbols and channel or interference estimation modulation symbols for each of the at least one SC-FDM symbol stream; estimating interference based at least in part on the channel or interference estimation modulation symbols; and decoding the data modulation symbols based at least in part on the estimated interference.

In some examples, the method may include performing equalization on each tone-demapped output, and the IDFT may be performed on each equalized tone-demapped output. In some examples, the channel or interference estimation modulation symbols may include at least one of: zero symbols or known non-zero symbols. In some examples, the channel or interference estimation modulation symbols corresponding to an SC-FDM symbol stream may have a reduced modulation order with respect to the data modulation symbols corresponding to the SC-FDM symbol stream.

In some examples, the method may include receiving a plurality of SC-FDM symbol streams associated with different users, and recovering channel or interference estimation modulation symbols corresponding to the different users from different SC-FDM symbol streams in accordance with user-specific insertion period offsets. In some examples, a first plurality of data modulation symbols within a first group of modulation symbols corresponding to a first SC-FDM symbol stream may be decoded based at least in part on interference estimated for a first plurality of channel or interference estimation modulation symbols within a second group of modulation symbols corresponding to a second SC-FDM symbol stream.

In a sixth set of illustrative examples, another apparatus for wireless communication is described. In one configuration, the apparatus may include means for performing an IDFT on a tone-demapped output of a DFT for each of at least one SC-FDM symbol stream, to recover a plurality of data modulation symbols and channel or interference estimation modulation symbols for each of the at least one SC-FDM symbol stream; means for estimating interference based at least in part on the channel or interference estimation modulation symbols; and means for decoding the data modulation symbols based at least in part on the estimated interference. In some examples, the apparatus may further include means for implementing one or more aspects of the method for wireless communication described above with respect to the fifth set of illustrative examples.

In a seventh set of illustrative examples, an apparatus for wireless communication is described. In one configuration, the apparatus may include a processor, memory in electronic communication with the processor, and instructions stored in the memory. The instructions may be executable by the processor to perform an IDFT on a tone-demapped output of a DFT for each of at least one SC-FDM symbol stream, to recover a plurality of data modulation symbols and channel or interference estimation modulation symbols for each of the at least one SC-FDM symbol stream; to estimate interference based at least in part on the channel or interference estimation modulation symbols; and to decode the data modulation symbols based at least in part on the estimated interference. In some examples, the instructions may also be executable by the processor to implement one or more aspects of the method for wireless communication described above with respect to the fifth set of illustrative examples.

In an eighth set of illustrative examples, another computer-readable medium for storing instructions executable by a processor is described. In one configuration, the computer-readable medium may include instructions to perform an IDFT on a tone-demapped output of a DFT for each of at least one SC-FDM symbol stream, to recover a plurality of data modulation symbols and channel or interference estimation modulation symbols for each of the at least one SC-FDM symbol stream; instructions to estimate interference based at least in part on the channel or interference estimation modulation symbols; and instructions to decode the data modulation symbols based at least in part on the estimated interference. In some examples, the computer-readable medium may also include instructions to implement one or more aspects of the method for wireless communication described above with respect to the fifth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which a shared radio frequency spectrum is used for at least a portion of communications over a wireless communication system. In some examples, the shared radio frequency spectrum may be used for LTE/LTE-A communications. The shared radio frequency spectrum may be used in combination with, or independent from, a dedicated radio frequency spectrum. The dedicated radio frequency spectrum may be a radio frequency spectrum for which transmitting apparatuses may not contend for access because the radio frequency spectrum is licensed to particular users, such as a licensed radio frequency spectrum usable for LTE/LTE-A communications. The shared radio frequency spectrum may be a radio frequency spectrum for which a device may contend for access (e.g., a radio frequency spectrum that is available for unlicensed use, such as Wi-Fi use, or a radio frequency spectrum that is available for use by multiple operators in an equally shared or prioritized manner).

With increasing data traffic in cellular networks that use a dedicated radio frequency spectrum, offloading of at least some data traffic to a shared radio frequency spectrum may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum may also provide service in areas where access to a dedicated radio frequency spectrum is unavailable. However, use of the shared radio frequency spectrum may expose transmissions, such as transmissions of SC-FDM symbol streams between a UE and a base station, to bursty interference. Detecting and removing the bursty interference may improve the process of decoding data included in the SC-FDM symbol streams.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
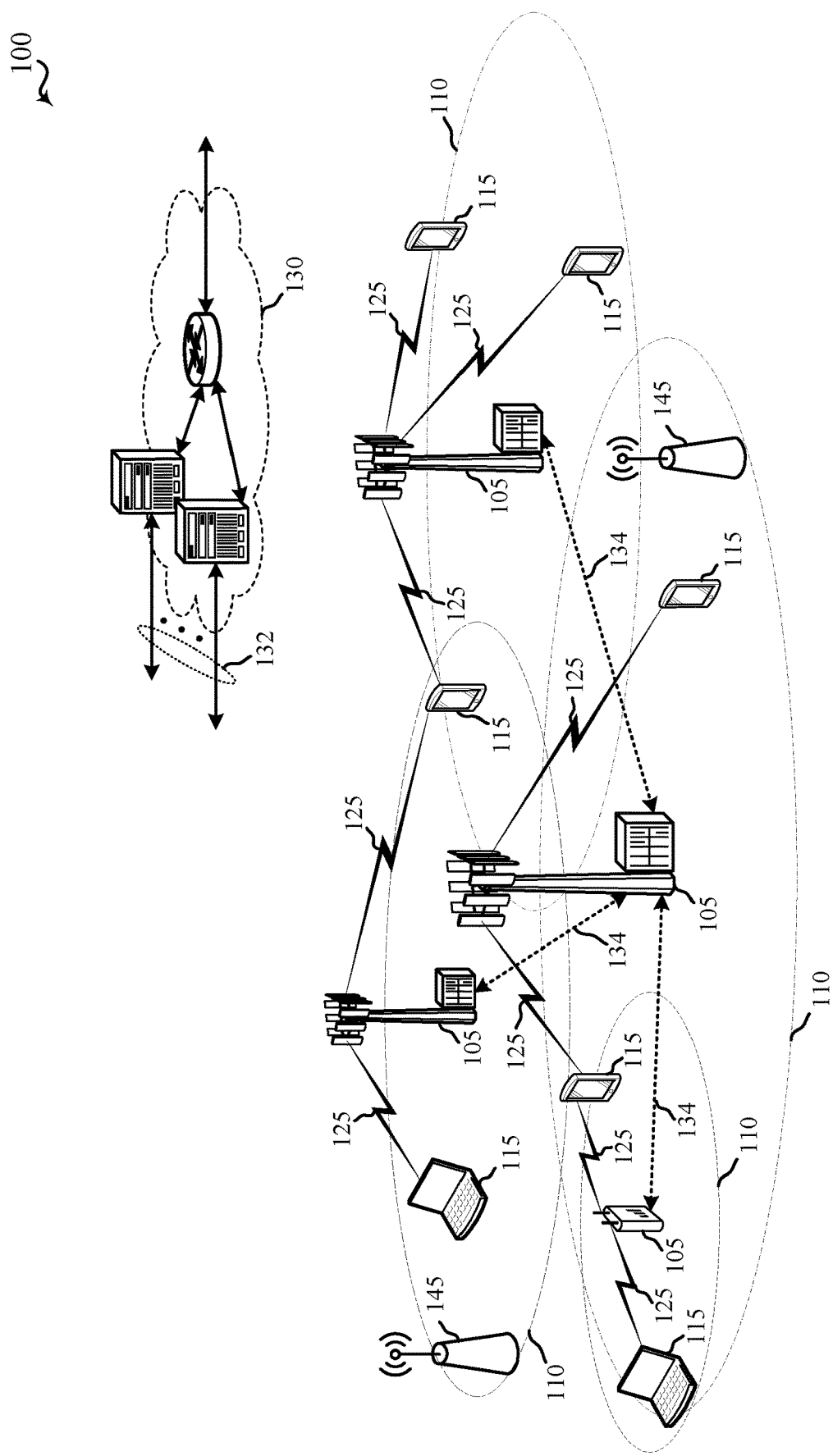
FIG. 1 illustrates an example of a wireless communication system, in accordance with various aspects of the disclosure.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, the wireless communication system 100 may support operation over a dedicated radio frequency spectrum (e.g., a radio frequency spectrum for which transmitting apparatuses may not contend for access because the radio frequency spectrum is licensed to particular users for particular uses, such as a licensed radio frequency spectrum usable for LTE/LTE-A communications) or a shared radio frequency spectrum (e.g., a radio frequency spectrum for which transmitting apparatuses may contend for access (e.g., a radio frequency spectrum that is available for unlicensed use, such as Wi-Fi use, or a radio frequency spectrum that is available for use by multiple operators in an equally shared or prioritized manner)).

In some examples, the resource blocks (RBs) which may be used by a base station 105 or UE 115 to make a transmission may have 12×14=168 resource elements (REs; e.g., 12 frequency subcarriers multiplied by 14 symbol periods in a subframe). In the shared radio frequency spectrum, and in some examples, 100 resource blocks may be allocated, in parallel, for downlink transmissions or uplink transmissions. In some examples (e.g., in the case of uplink transmissions), the resources (e.g., RBs) allocated to a transmitting apparatus may be interleaved with the resources allocated to one or more other transmitters. In some examples, a transmitting apparatus may be allocated one or more interlaces of resources (e.g., one or more of ten interlaces, where each interlace includes a set of ten resource blocks that are interleaved with other resource blocks spanning the allocable shared radio frequency spectrum). Alternately, contiguous resources may be allocated to a transmitting apparatus.

As shown in FIG. 1, one or more WLAN access points 145 or other devices (e.g., WLAN stations) may transmit or receive within the footprint of the wireless communication system 100 (e.g., within the coverage areas of the base stations 105, or within the communication ranges of the UEs 115). The access points 145 or other devices may transmit over the shared radio frequency spectrum used by the base stations 105 and UEs 115. In some cases, the base stations 105 and UEs 115 may contend for access to the shared radio frequency spectrum and transmit channel reservation signals on the shared radio frequency spectrum that cause the access points 145 or other devices to refrain from transmitting on the shared radio frequency spectrum while the base stations 105 or UEs 115 are transmitting. However, scenarios may arise in which the access points 145 or other devices do not receive the channel reservation signals and transmit anyway, thereby interfering with the transmissions between the base stations 105 and UEs 115. At times, the transmissions by the access points 145 or other devices may be bursty (e.g., the transmissions may last less than one millisecond (ms)). The present disclosure describes techniques for estimating such bursty interference (and in some examples, subtracting such bursty interference from data modulation symbols during the decoding of the data modulation symbols).

Figure 2:
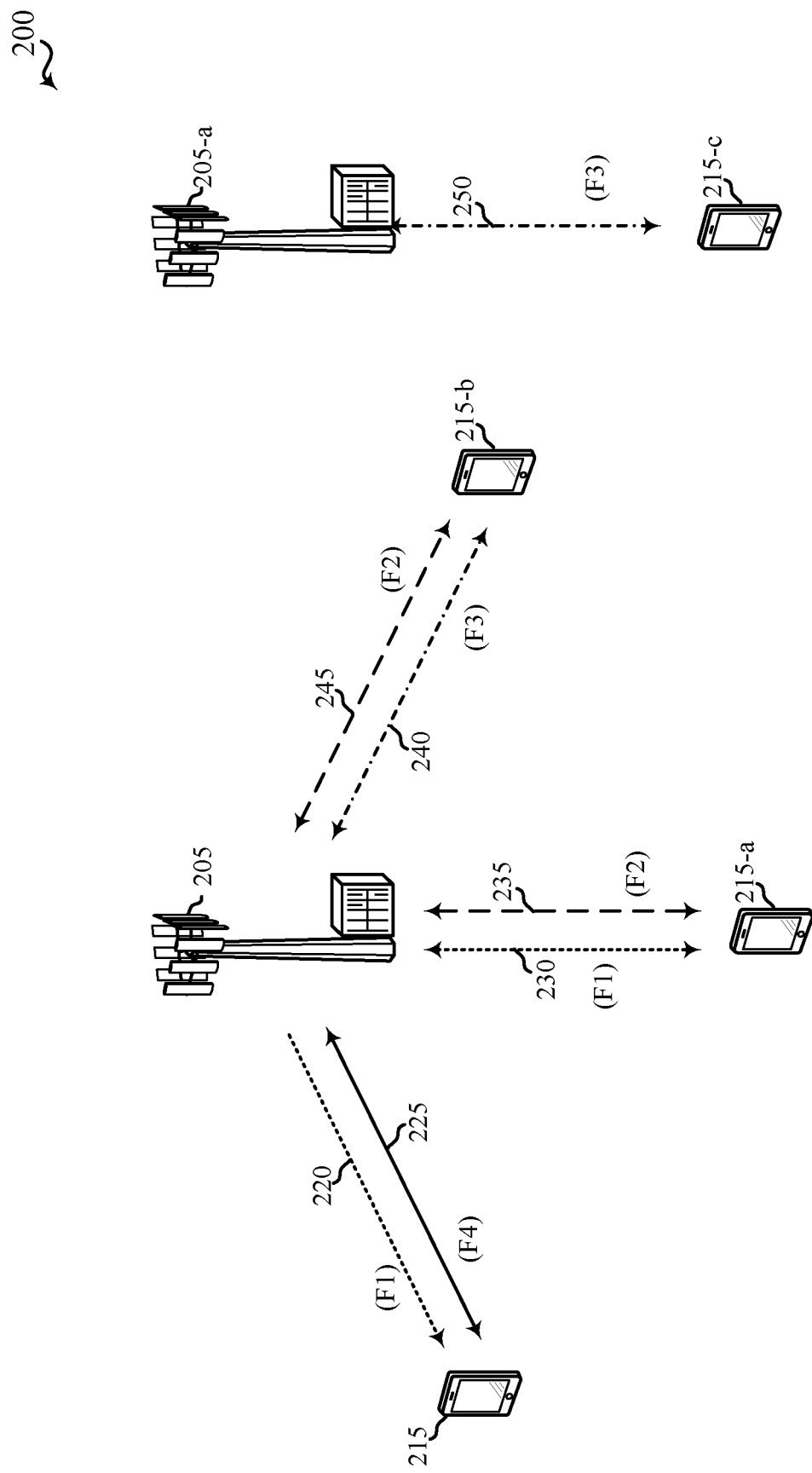
FIG. 2 shows a wireless communication system in which LTE/LTE-A may be deployed under different scenarios using a shared radio frequency spectrum, in accordance with various aspects of the present disclosure.

FIG. 2 shows a wireless communication system 200 in which LTE/LTE-A may be deployed under different scenarios using a shared radio frequency spectrum, in accordance with various aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum. The downlink channel 220 in the shared radio frequency spectrum and the first bidirectional link 225 in the dedicated radio frequency spectrum may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and would benefit from relieving some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum. The second bidirectional link 230 may provide a downlink and uplink capacity offload for the first base station 205. Like the supplemental downlink (e.g., the licensed assisted access mode) described above, this scenario may occur with any service provider (e.g., MNO) that uses a dedicated radio frequency spectrum and would benefit from relieving some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the dedicated radio frequency spectrum. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum and use a shared radio frequency spectrum for capacity offload.

As described above, one type of service provider that may benefit from the capacity offload offered by using LTE/LTE-A in a shared radio frequency spectrum is a traditional MNO having access rights to an LTE/LTE-A dedicated radio frequency spectrum. For these service providers, an operational example may include a bootstrapped mode (e.g., supplemental downlink (e.g., licensed assisted access), carrier aggregation) that uses the LTE/LTE-A primary component carrier (PCC) on the dedicated radio frequency spectrum and at least one secondary component carrier (SCC) on the shared radio frequency spectrum.

In the carrier aggregation mode, data and control may, for example, be communicated in the dedicated radio frequency spectrum (e.g., via first bidirectional link 225, third bidirectional link 235, and fifth bidirectional link 245) while data may, for example, be communicated in the shared radio frequency spectrum (e.g., via second bidirectional link 230 and fourth bidirectional link 240). The carrier aggregation mechanisms supported when using a shared radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, or resource block interleaved FDMA waveforms from the fourth UE 215-*c* using the bidirectional link 250. The bidirectional link 250 may be associated with the frequency F3 in the shared radio frequency spectrum. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum.

Figure 3:
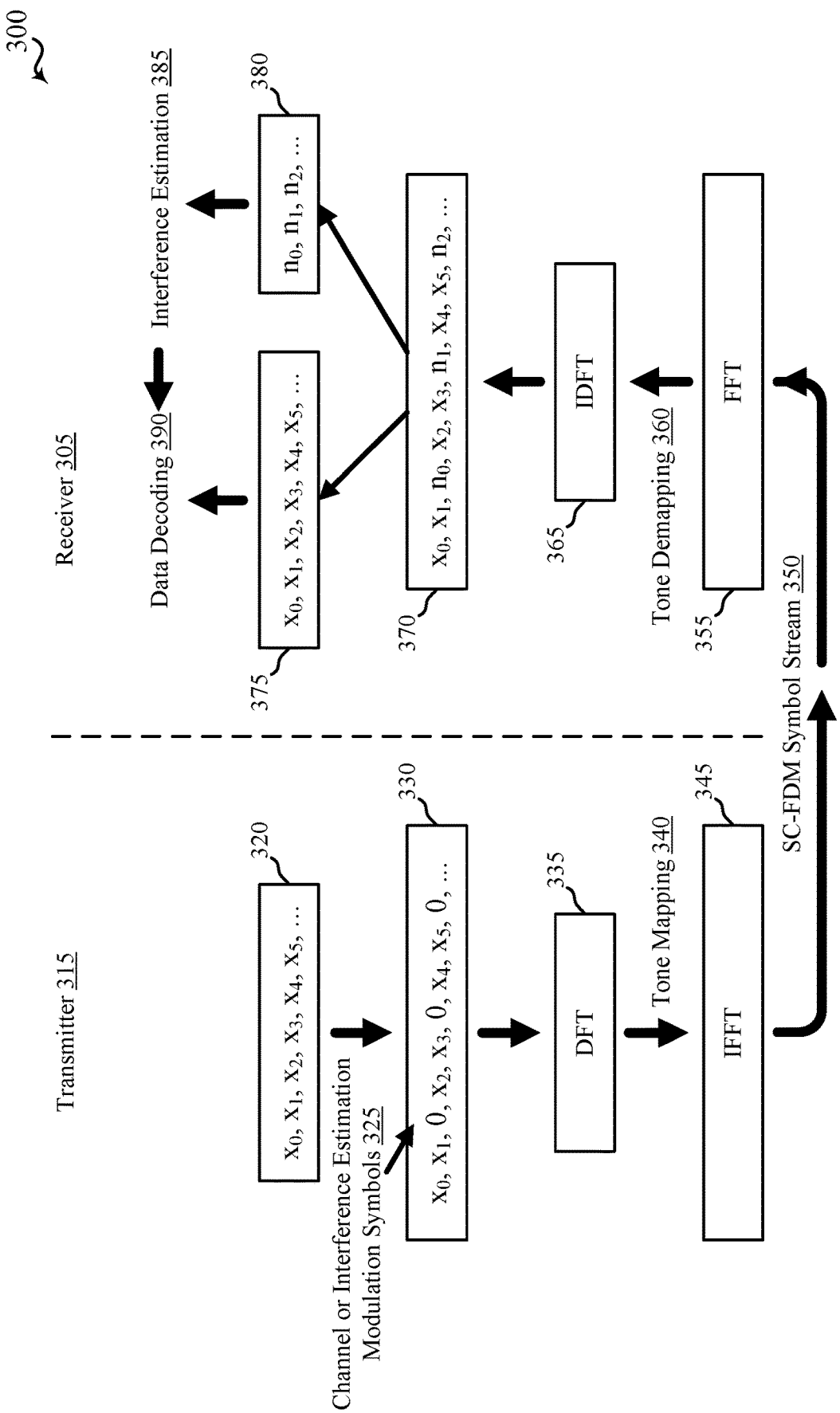
FIG. 3 shows a process flow of a SC-FDM transmission between a transmitter and a receiver, in accordance with various aspects of the present disclosure.

FIG. 3 shows a process flow 300 of a SC-FDM transmission between a transmitter 315 and a receiver 305, in accordance with various aspects of the present disclosure. The transmitter 315 may be an example of aspects of one or more of the UEs 115, 215, 215-*a*, 215-*b*, or 215-*c* described with reference to FIG. 1 or 2, and the receiver 305 may be an example of aspects of one or more of the base stations 105, 205, or 205-*a* described with reference to FIG. 1 or 2.

At 330, and at the transmitter 315,channel or interference estimation modulation symbols 325 (e.g., 0's) may be inserted into a sequence of data modulation symbols 320 (e.g., data modulation symbols $x_0$, $x_1$, $x_2$, $x_3$, $x_4$, $x_5$, . . . ). The data modulation symbols may include any of quadrature phase shift keying (QPSK) symbols, 16 quadrature amplitude modulation (16-QAM) symbols, 64-QAM symbols, etc. The channel or interference estimation modulation symbols may include zero symbols or known non-zero symbols (i.e., symbols having values that are known a priori to the receiver 305). Known non-zero symbols may in some cases be used to enhance channel estimation at the transmitter 315. On the other hand, measured interference based on known non-zero symbols may be biased by channel estimation scaling errors (which may be okay for 16-QAM symbols or 64-QAM symbols because the channel estimation scaling errors increase the measured interference, but less desirable for QPSK symbols because the channel estimation scaling errors do not appreciably increase the measured interference). In some examples, the data modulation symbols in the sequence of data modulation symbols 320 may be rate-matched to the channel or interference estimation modulation symbols 325. The rate-matching may be adaptable, for example where a lower order modulation scheme is used and fewer channel or interference estimation modulation symbols are needed to rate-match the data modulation symbols (and vice-versa if a higher order modulation scheme is used).

In some examples, the channel or interference estimation modulation symbols 325 may be inserted into the sequence of data modulation symbols 320 in response to an instruction (e.g., a channel or interference estimation modulation symbol insertion instruction) transmitted from the transmitter 315 to the receiver 305. The instruction may be received at the receiver 305 in connection with a transmission grant (e.g., an uplink grant) or control signaling. The instruction may include a semi-static instruction or a dynamic instruction. In some examples, the receiver 305 may identify a channel or interference estimation modulation symbol insertion policy based at least in part on the instruction. The receiver 305 may also determine a user-specific (e.g., UE-specific) insertion period offset for inserting the channel or interference estimation modulation symbols 325.

At 335, a discrete Fourier transform (DFT; e.g. an N-point DFT) may be performed on a group of modulation symbols in the sequence of data modulation symbols. The group of modulation symbols may include at least one of the channel or interference estimation modulation symbols. Following the DFT, a SC-FDM symbol stream may be generated. In some examples, generating the SC-FDM symbol stream may include performing a tone mapping 340 (i.e., a subcarrier mapping) based at least in part on the output of the DFT. In some systems, the tone mapping may be performed on consecutive tones; however, tone mapping 340 may also be performed on non-consecutive tones. From the output of the tone mapping, an inverse fast Fourier transform (IFFT; e.g., an M-point IFFT) 345 is performed. In some examples, a same number of channel or interference estimation modulation symbols may be included in each SC-FDM symbol of the SC-FDM symbol stream.

At 350, the SC-FDM symbol stream may be transmitted from the transmitter 315 to the receiver 305. When the transmitter 315 is a UE, the SC-FDM symbol stream may be transmitted on an uplink channel, to a base station. In some examples, a same number of channel or interference estimation modulation symbols may be included in each SC-FDM symbol of the SC-FDM symbol stream. In some examples, the SC-FDM symbol stream may be transmitted over a shared radio frequency spectrum (e.g., a radio frequency spectrum that is available for unlicensed use, such as Wi-Fi use, or a radio frequency spectrum that is available for use by multiple operators in an equally shared or prioritized manner).

The receiver 305 may receive the SC-FDM symbol stream transmitted by the transmitter 315 and, at 355, perform a fast Fourier transform (FFT; e.g., an M-point FFT) on the SC-FDM symbol stream. In some examples, the receiver 305 may receive a plurality of SC-FDM symbol streams in parallel, with different SC-FDM symbol streams being received from different users (e.g., different transmitters or UEs) (not shown), and an FFT may be performed on each SC-FDM symbol stream.

At 360, a tone demapping may be performed on the output of each DFT, and equalization and channel estimation may be performed on the tone demapped output of each DFT. Because the equalization may be imperfect, a residual ISI may remain after equalization, which residual ISI may distort the interference estimate(s) at 385. However, the residual ISI may be considered an integral part of the channel or interference estimation output, and may be removed during decoding.

At 365, an inverse DFT (IDFT) may be performed on each equalized tone-demapped output, to recover a plurality of data modulation symbols and channel or interference estimation modulation symbols 370 corresponding to each received SC-FDM symbol stream. In some examples, the data modulation symbols 375 (e.g., data modulation symbols $x_0, x_1, x_2, x_3, x_4, x_5, \ldots$) may be separated from the channel or interference estimation modulation symbols 380 (e.g., $n_0, n_1, n_2, \ldots$). In some examples, channel or interference estimation modulation symbols corresponding to different users may be recovered from different SC-FDM symbol streams in accordance with user-specific insertion period offsets.

At 385, interference (e.g., a signal-to-noise ratio (SNR)) may be estimated (e.g., measured) based at least in part on the channel or interference estimation modulation symbols 380. When the channel or interference estimation modulation symbols 380 comprise known non-zero symbols, the channel or interference may be estimated from the signal remaining after subtracting the known non-zero symbols from their respective channel or interference estimation modulation symbols 380. At 390, the data modulation symbols 375 may be decoded based at least in part on the estimated interference.

In some examples of the process flow 300, the channel or interference estimation modulation symbols 325 inserted into the sequence of data modulation symbols 320 may have a reduced modulation order with respect to the data modulation symbols. This may enable the receiver 305 to perform more reliable symbol-level constellation point detection for the channel or interference estimation modulation symbols 325.

During transmission of the SC-FDM symbol stream, at 350, the channel or interference estimation modulation symbols may span all frequencies within a number of resource blocks allocated for the SC-FDM symbol stream. However, in some cases, there may be a limitation on time span. For example, assume that 100 contiguous resource blocks are allocated to the transmitter 315, and that a channel or interference estimation modulation symbol is inserted in the position of every 100th modulation symbol in the sequence of data modulation symbols 320 (with rate matching). This means that one $T_s$=32 nanosecond (ns) sample of interference is taken every 5 microseconds (µs). A potential benefit to this is sub-symbol channel or interference estimation granularity (e.g., if a 5 µs burst of interference is detected, the receiver 305 may drop its log likelihood ratio (LLR) test for 5 µs of a received symbol stream but still process the remaining 55 µs. However, if the burst of interference lasts less than 5 µs, the burst may not be detected. Also, for statistically significant interference measurement, more than a single interference sample should be obtained. To mitigate these issues, transmitters that transmit SC-FDM symbol streams in parallel to the receiver 305 may insert channel or interference estimation modulation symbols into respective sequences of data modulation symbols in accordance with user-specific insertion period offsets (i.e., different insertion period offsets). The receiver 305 may then estimate a channel or interference based on the measured channel or interference associated with channel or interference estimation modulation symbols inserted into different sequences of modulation data symbols by different transmitters. In effect, a first plurality of data modulation symbols within a first group of modulation symbols corresponding to a first SC-FDM symbol stream may be decoded, at 390, based at least in part on a channel response or interference estimated for a first plurality of channel or interference estimation modulation symbols within a second group of modulation symbols corresponding to a second SC-FDM symbol stream (or based on a channel response or interference estimated for channel or interference estimation modulation symbols corresponding to a plurality of other SC-FDM symbol streams). The first group of modulation symbols may also be decoded based at least in part on interference estimated for a second plurality of channel or interference estimation modulation symbols within the first group of modulation symbols.

In an interleaved resource allocation, a channel or interference estimation modulation symbol inserted into the sequence of data modulation symbols 320 by the transmitter 315 may not have a one-to-one correspondence to transmitted time samples of the SC-FDM symbol stream transmitted at 350. However, a set-wise correspondence between the inserted channel or interference estimation modulation symbol and a group of data modulation symbols still exists (e.g., a channel or interference estimation modulation symbol in a first part of the input to the DFT, at 335, will be mostly sensitive to interference in a first part of a corresponding SC-FDM symbol.

In examples of the process flow 300 in which the transmitter 315 is allocated one or more interlaces (i.e., frequency interlaces) of transmission resources, the transmitter 315 may implement a channel or interference estimation modulation symbol insertion policy that inserts a fixed number of channel or interference estimation modulation symbols per SC-FDM symbol per allocated interface. For example, the insertion policy may specify an insertion of four channel or interference estimation modulation symbols per allocated interlace. Thus, if the transmitter 315 is allocated N interlaces, the transmitter 315 may insert 4N channel or interference estimation modulation symbols per SC-FDM symbol. If each interlace of transmission resources includes ten resource blocks transmitted in parallel, with each resource block including twelve tones (or subcarriers), the insertion of four channel or interference estimation modulation symbols per interlace represents an insertion-detection modulation symbol overhead of approximately 3%. In such an example, the indices of the channel or interference estimation modulation symbols may be determined, for example, using the following algorithm:

```
for i = 0 : N−1
    for j = 0 : 3
        Index(i, j) = j*30*N + Interlace_idx(i)*3*N
    end
end
```

In addition to (or instead of) the process flow 300 described with reference to FIG. 3, the receiver 305 (e.g., a base station) may reserve some resources (e.g., resource blocks or frequency interlaces) on which no transmitter 315 (e.g., no UE) is scheduled. The interference associated with these resources may then be estimated (e.g., measured), and the estimated interference may be assumed to be the same for scheduled transmitters and used to decode the data modulation symbols received for the scheduled transmitter (s). Of note, it may be sufficient, in some examples, to measure a wideband interference delta between channel or interference estimation modulation symbols, and then add the measured delta to a subband-dependent interference measured based on one or more demodulation reference symbols (DM-RSs).

Also in addition to (or instead of) the process flow 300 described with reference to FIG. 3, the receiver 305 may schedule some resources with a conservative modulation and coding scheme (MCS). Modulation symbols transmitted with the conservative (e.g., lower) MCS may be able to be decoded despite these modulation symbols being associated with a higher level of interference. After the modulation symbols transmitted with the conservative MCS are decoded, the receiver 305 may subtract the decoded modulation symbols from their respective symbol positions to obtain a residual signal. The residual signal represents the interference associated with the modulation symbols and may be measured to quantify the interference associated with the decoded modulation symbols. The measured interference may then be subtracted from other modulation symbols, to improve the chance of decoding these other modulation symbols. In an alternative to using a conservative MCS, the interference associated with modulation symbols successfully decoded in one channel (e.g., a physical uplink control channel (PUCCH), sounding reference signal (SRS), or physical random access channel (PRACH)) may be estimated and subtracted from another channel (e.g., a physical uplink shared channel (PUSCH)), to improve the chance of decoding modulation symbols received in the other channel.

Figure 4:
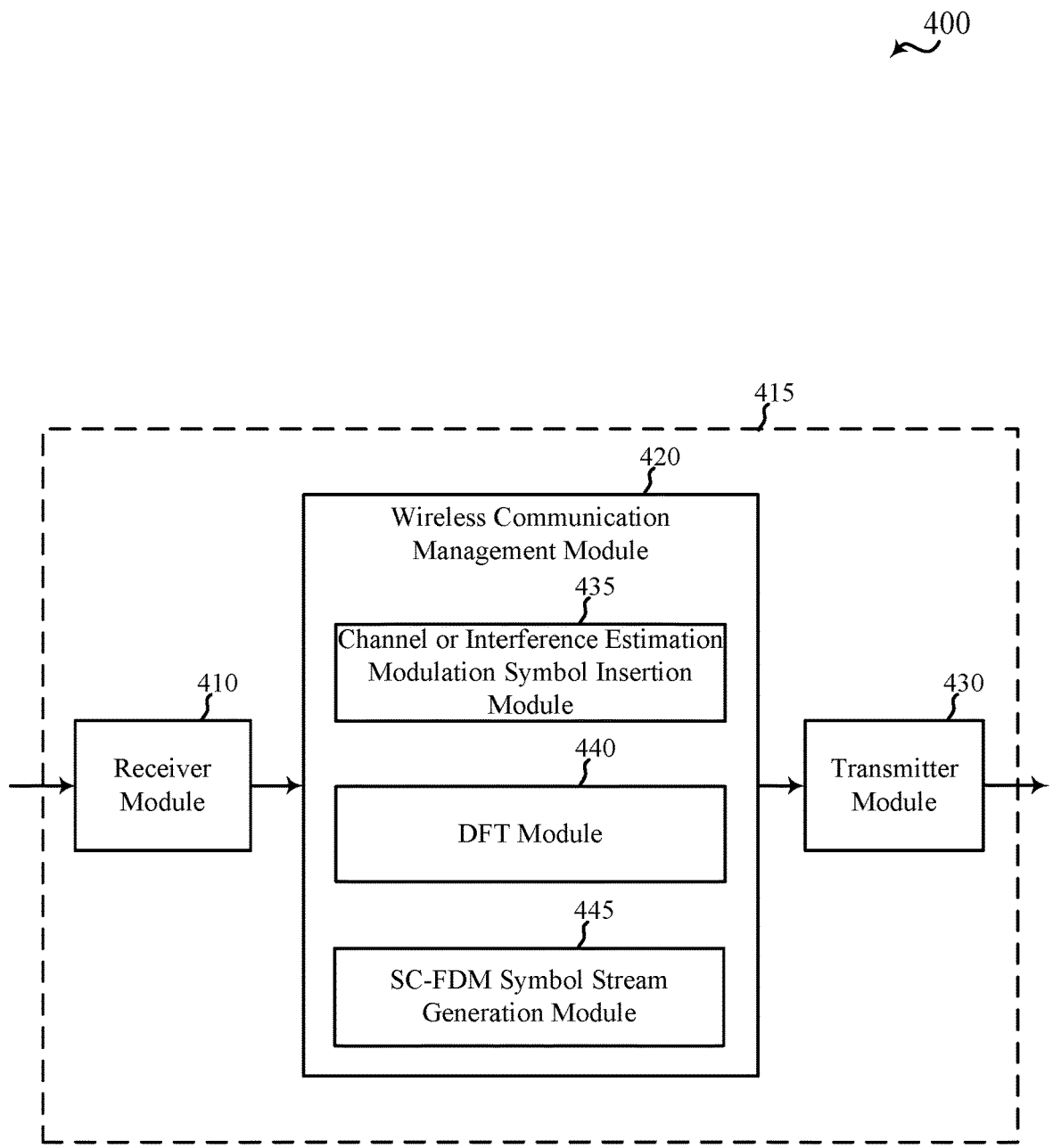
FIG. 4 shows a block diagram of an apparatus for use in wireless communication, in accordance with various aspects of the present disclosure.

FIG. 4 shows a block diagram 400 of an apparatus 415 for use in wireless communication, in accordance with various aspects of the present disclosure. The apparatus 415 may be an example of aspects of one or more of the UEs 115, 215, 215-a, 215-b, or 215-c described with reference to FIG. 1 or 2, or aspects of the transmitter 315 described with reference to FIG. 3. The apparatus 415 may also be or include a processor. The apparatus 415 may include a receiver module 410, a wireless communication management module 420, or a transmitter module 430. Each of these modules may be in communication with each other.

The modules of the apparatus 415 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System on Chip (SoC), or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 410 may include at least one radio frequency (RF) receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1 or 2. The receiver module 410 may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 430 may include at least one RF transmitter, such as at least one RF transmitter operable to transmit over the dedicated radio frequency spectrum or the shared radio frequency spectrum. The transmitter module 430 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the wireless communication management module 420 may be used to manage one or more aspects of wireless communication for the apparatus 415. In some examples, the wireless communication management module 420 may include a channel or interference estimation modulation symbol insertion module 435, a DFT module 440, or a SC-FDM symbol stream generation module 445.

The channel or interference estimation modulation symbol insertion module 435 may be used to insert channel or interference estimation modulation symbols into a sequence of data modulation symbols. In some examples, data modulation symbols in the sequence of data modulation symbols may be rate-matched to the channel or interference estimation modulation symbols. In some examples, the channel or interference estimation modulation symbols may include zero symbols. In some examples, the channel or interference estimation modulation symbols may include known non-zero symbols. In some examples, the channel or interference estimation modulation symbols may have a reduced modulation order with respect to the data modulation symbols.

The DFT module 440 may be used to perform a DFT on a group of modulation symbols in the sequence of data modulation symbols. The group of modulation symbols may include at least one of the channel or interference estimation modulation symbols.

The SC-FDM symbol stream generation module 445 may be used to generate a SC-FDM symbol stream based at least in part on an output of the DFT. In some examples, generating the SC-FDM symbol stream may include performing a tone mapping based at least in part on the output of the DFT, and performing an IFFT on an output of the tone mapping. The SC-FDM symbol stream may be transmitted to a receiver (e.g., the SC-FDM symbol stream may be transmitted on an uplink channel, to a base station), via the transmitter module 430. In some examples, the SC-FDM symbol stream may be transmitted over the shared radio frequency spectrum.

In some examples, the channel or interference estimation modulation symbols may span all frequencies within a number of resource blocks allocated for the SC-FDM symbol stream. In some examples, a same number of channel or interference estimation modulation symbols may be included in each SC-FDM symbol of the SC-FDM symbol stream.

Figure 5:
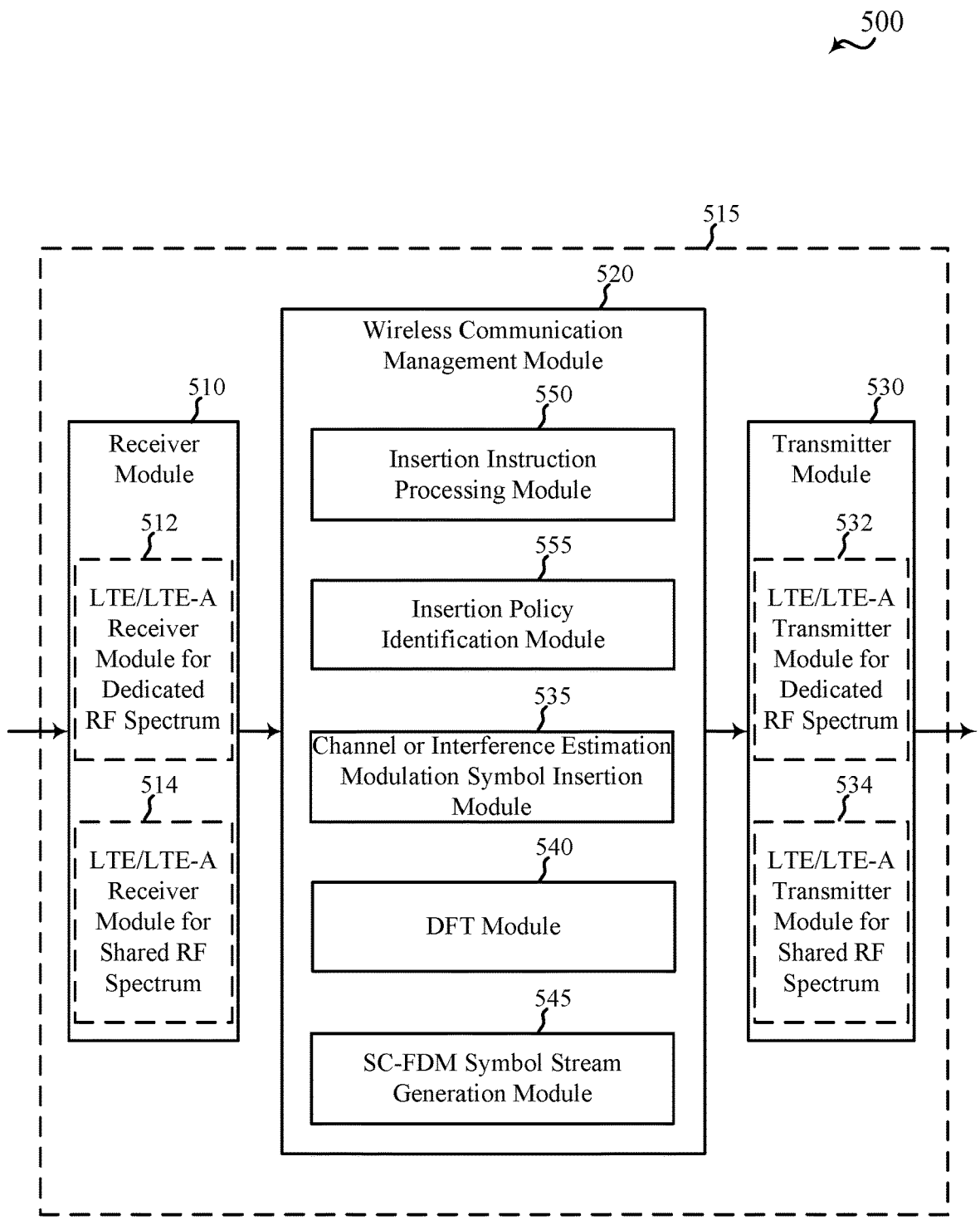
FIG. 5 shows a block diagram of an apparatus for use in wireless communication, in accordance with various aspects of the present disclosure.

FIG. 5 shows a block diagram 500 of an apparatus 515 for use in wireless communication, in accordance with various aspects of the present disclosure. The apparatus 515 may be an example of aspects of one or more of the UEs 115, 215, 215-a, 215-b, or 215-c described with reference to FIG. 1 or 2, aspects of the transmitter 315 described with reference to FIG. 3, or aspects of the apparatus 415 described with reference to FIG. 4. The apparatus 515 may also be or include a processor. The apparatus 515 may include a receiver module 510, a wireless communication management module 520, or a transmitter module 530. Each of these modules may be in communication with each other.

The modules of the apparatus 515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 510 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1 or 2. The receiver module 510 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 512), and an LTE/LTE-A receiver module for communicating over the shared radio frequency spectrum (e.g., LTE/LTE-A receiver module for shared RF spectrum 514). The receiver module 510, including the LTE/LTE-A receiver module for dedicated RF spectrum 512 or the LTE/LTE-A receiver module for shared RF spectrum 514, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 530 may include at least one RF transmitter, such as at least one RF transmitter operable to transmit over the dedicated radio frequency spectrum or the shared radio frequency spectrum. The transmitter module 530 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 532), and an LTE/LTE-A transmitter module for communicating over the shared radio frequency spectrum (e.g., LTE/LTE-A transmitter module for shared RF spectrum 534). The transmitter module 530, including the LTE/LTE-A transmitter module for dedicated RF spectrum 532 or the LTE/LTE-A transmitter module for shared RF spectrum 534, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum or the second radio frequency spectrum.

In some examples, the wireless communication management module 520 may be used to manage one or more aspects of wireless communication for the apparatus 515. In some examples, the wireless communication management module 520 may include an insertion instruction processing module 550, an insertion policy identification module 555, a channel or interference estimation modulation symbol insertion module 535, a DFT module 540, or a SC-FDM symbol stream generation module 545.

The insertion instruction processing module 550 may be used to receive a channel or interference estimation modulation symbol insertion instruction from a base station. In some examples, the channel or interference estimation modulation symbol insertion instruction may be received in connection with a transmission grant (e.g., an uplink grant) from the base station, or in connection with control signaling of the base station. The channel or interference estimation modulation symbol insertion instruction may include a semi-static instruction or a dynamic instruction.

The insertion policy identification module 555 may be used to optionally identify a channel or interference estimation modulation symbol insertion policy based at least in part on the channel or interference estimation modulation symbol insertion instruction. The insertion policy identification module 555 may also be used to determine a user-specific (e.g., UE-specific) insertion period offset for inserting the channel or interference estimation modulation symbols. In some examples, the user-specific insertion period offset may be identified by the channel or interference estimation modulation symbol insertion policy.

The channel or interference estimation modulation symbol insertion module 535 may be used to insert channel or interference estimation modulation symbols into a sequence of data modulation symbols. The channel or interference estimation modulation symbol insertion module 535 may insert the channel or interference estimation modulation symbols into the sequence of data modulation symbols in accordance with the insertion instruction received by the insertion instruction processing module 550 and/or in accordance with the insertion policy or user-specific insertion period offset identified by the insertion policy identification module 555. In some examples, data modulation symbols in the sequence of data modulation symbols may be rate-matched to the channel or interference estimation modulation symbols. In some examples, the channel or interference estimation modulation symbols may include zero symbols. In some examples, the channel or interference estimation modulation symbols may include known non-zero symbols.

In some examples, the channel or interference estimation modulation symbols may have a reduced modulation order with respect to the data modulation symbols.

The DFT module 540 may be used to perform a DFT on a group of modulation symbols in the sequence of data modulation symbols. The group of modulation symbols may include at least one of the channel or interference estimation modulation symbols.

The SC-FDM symbol stream generation module 545 may be used to generate a SC-FDM symbol stream based at least in part on an output of the DFT. In some examples, generating the SC-FDM symbol stream may include performing a tone mapping based at least in part on the output of the DFT, and performing an IFFT on an output of the tone mapping. The SC-FDM symbol stream may be transmitted to a receiver (e.g., the SC-FDM symbol stream may be transmitted on an uplink channel, to a base station), via the transmitter module 430. In some examples, the SC-FDM symbol stream may be transmitted over the shared radio frequency spectrum.

In some examples, the channel or interference estimation modulation symbols may span all frequencies within a number of resource blocks allocated for the SC-FDM symbol stream. In some examples, a same number of channel or interference estimation modulation symbols may be included in each SC-FDM symbol of the SC-FDM symbol stream.

Figure 6:
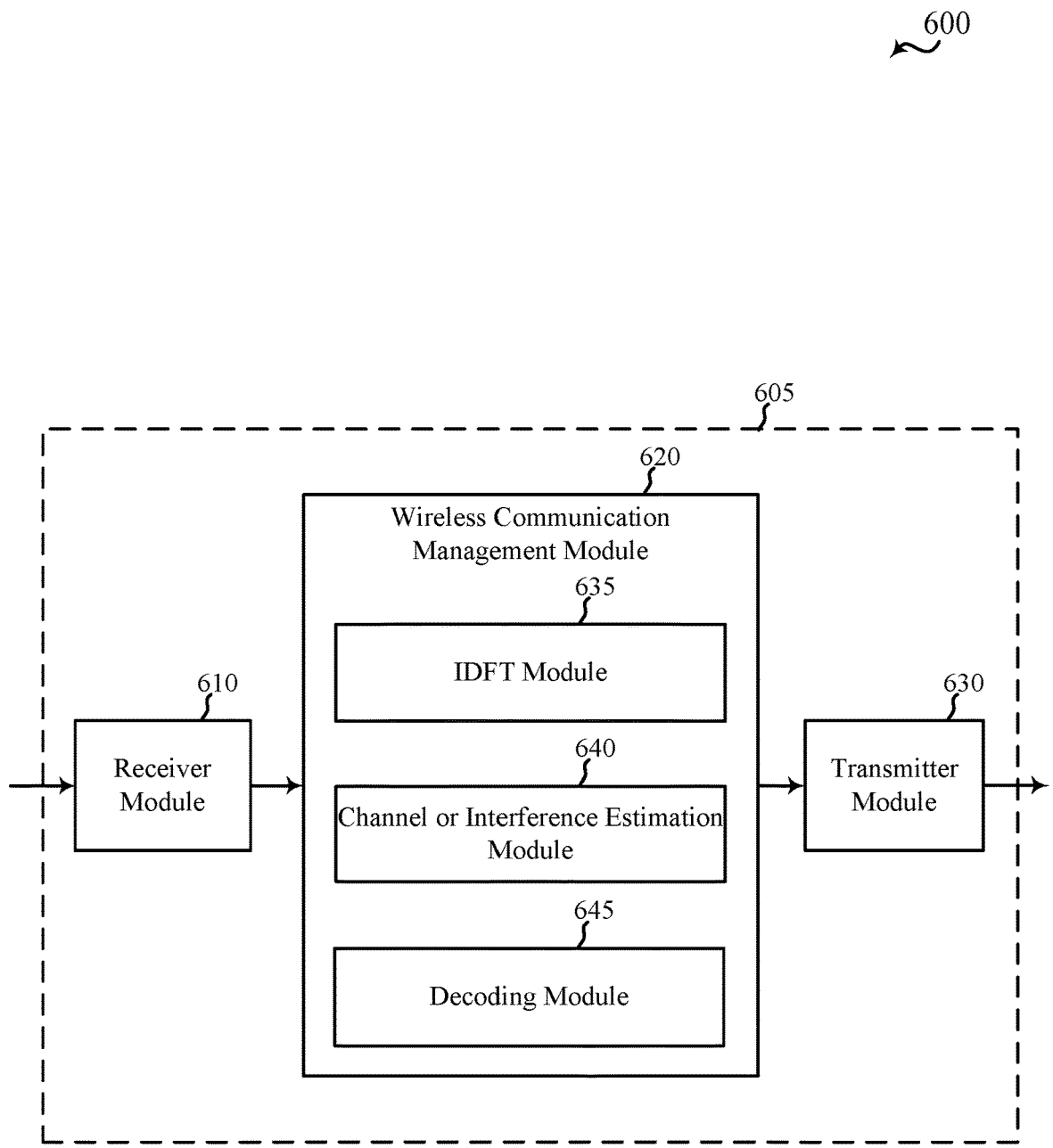
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the base stations 105, 205, or 205-a, described with reference to FIG. 1 or 2, or aspects of the receiver 305 described with reference to FIG. 3. The apparatus 605 may also be or include a processor. The apparatus 605 may include a receiver module 610, a wireless communication management module 620, or a transmitter module 630. Each of these modules may be in communication with each other.

The modules of the apparatus 605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 610 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1 or 2. The receiver module 610 may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 630 may include at least one RF transmitter, such as at least one RF transmitter operable to transmit over the dedicated radio frequency spectrum or the shared radio frequency spectrum. The transmitter module 630 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the wireless communication management module 620 may be used to manage one or more aspects of wireless communication for the apparatus 605. In some examples, the wireless communication management module 620 may include an IDFT module 635, a channel or interference estimation module 640, or a decoding module 645.

The IDFT module 635 may be used to perform an IDFT on a tone-demapped output of a DFT for each of at least one SC-FDM symbol stream, to recover a plurality of data modulation symbols and channel or interference estimation modulation symbols for each of the at least one SC-FDM symbol stream. In some examples, the channel or interference estimation modulation symbols may include zero symbols. In some examples, the channel or interference estimation modulation symbols may include known non-zero symbols. In some examples, the channel or interference estimation modulation symbols corresponding to an SC-FDM symbol stream (e.g., an SC-FDM symbol stream received from a particular user) may have a reduced modulation order with respect to the data modulation symbols corresponding to the SC-FDM symbol stream. In some examples, a same number of channel or interference estimation modulation symbols may be included in each SC-FDM symbol of the SC-FDM symbol stream.

The channel or interference estimation module 640 may be used to estimate a channel response or interference (e.g., at least one SNR) based at least in part on the channel or interference estimation modulation symbols.

The decoding module 645 may be used to decode the data modulation symbols based at least in part on the estimated channel response or interference.

Figure 7:
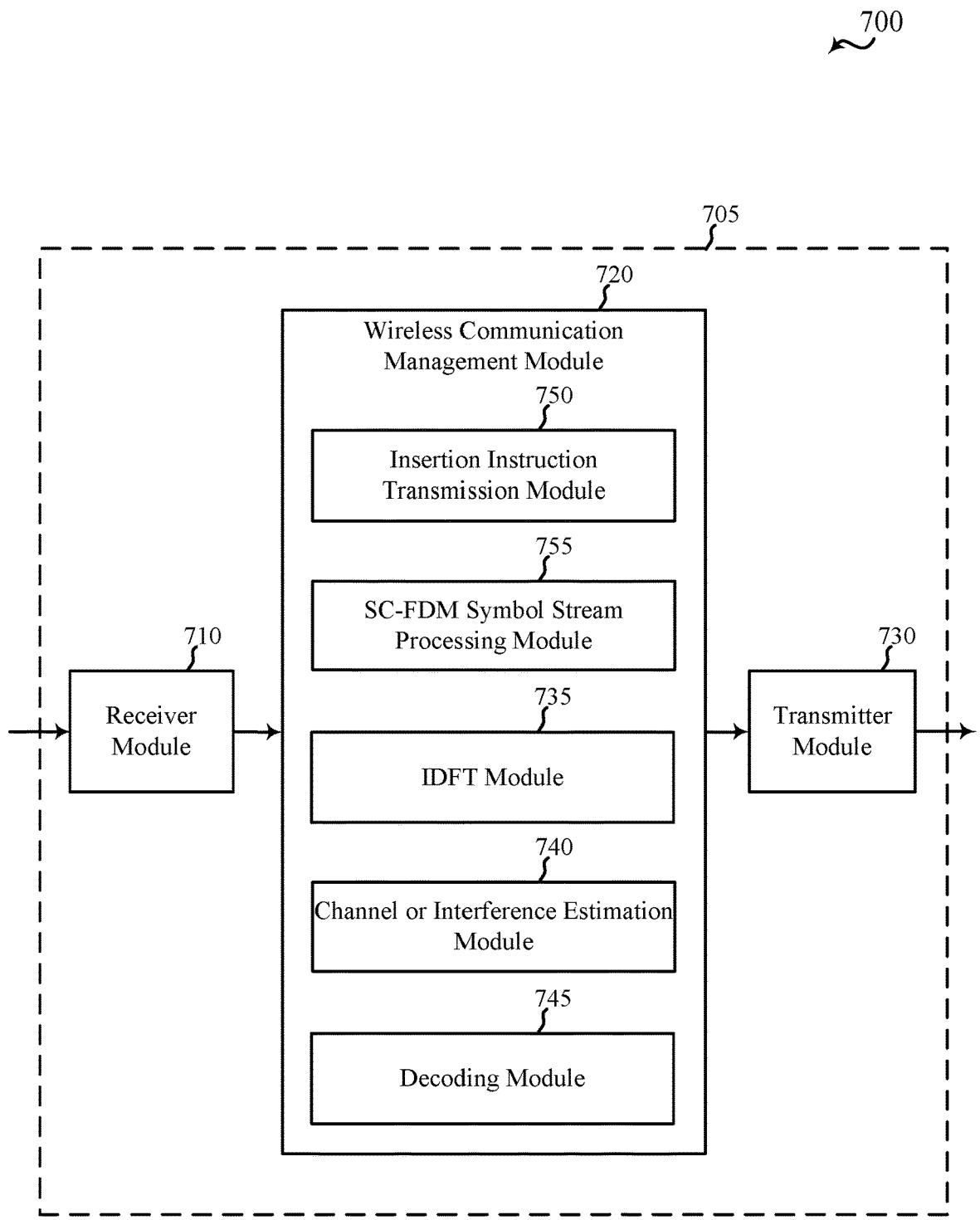
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the base stations 105, 205, or 205-a described with reference to FIG. 1 or 2, aspects of the receiver 305 described with reference to FIG. 3, or aspects of the apparatus 605 described with reference to FIG. 6. The apparatus 705 may also be or include a processor. The apparatus 705 may include a receiver module 710, a wireless communication management module 720, or a transmitter module 730. Each of these modules may be in communication with each other.

The modules of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 710 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1 or 2. The receiver module 710 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 712), and an LTE/LTE-A receiver module for communicating over the shared radio frequency spectrum (e.g., LTE/LTE-A receiver module for shared RF spectrum 714). The receiver module 710, including the LTE/LTE-A receiver module for dedicated RF spectrum 712 or the LTE/LTE-A receiver module for shared RF spectrum 714, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 730 may include at least one RF transmitter, such as at least one RF transmitter operable to transmit over the dedicated radio frequency spectrum or the shared radio frequency spectrum. The transmitter module 730 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 732), and an LTE/LTE-A transmitter module for communicating over the shared radio frequency spectrum (e.g., LTE/LTE-A transmitter module for shared RF spectrum 734). The transmitter module 730, including the LTE/LTE-A transmitter module for dedicated RF spectrum 732 or the LTE/LTE-A transmitter module for shared RF spectrum 734, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum or the second radio frequency spectrum.

In some examples, the wireless communication management module 720 may be used to manage one or more aspects of wireless communication for the apparatus 705. In some examples, the wireless communication management module 720 may include an insertion instruction transmission module 750, an SC-FDM symbol stream processing module 755, an IDFT module 735, a channel or interference estimation module 740, or a decoding module 745.

The insertion instruction transmission module 750 may be used to transmit channel or interference estimation modulation symbol insertion instructions to one or more UEs. In some examples, the channel or interference estimation modulation symbol insertion instructions may be transmitted in connection with transmission grants (e.g., uplink grants) transmitted to the UEs, or in connection with control signaling transmitted to the UEs. A channel or interference estimation modulation symbol insertion instruction may include a semi-static instruction or a dynamic instruction.

The SC-FDM symbol stream processing module 755 may be used to receive a plurality of SC-FDM symbol streams associated with different users (e.g., different UEs). In some examples, the SC-FDM symbol streams may be received over the shared radio frequency spectrum. In some examples, the SC-FDM symbol stream processing module 755 may be used to process received SC-FDM symbol streams by, for example, performing equalization on a tone-demapped output of a DFT for each SC-FDM symbol stream. In some examples, the SC-FDM symbol stream processing module 755 may be used to process received SC-FDM symbol streams by, for example, performing a FFT on each SC-FDM symbol stream to obtain an output of a DFT, performing a tone-demapping on the output of each DFT, and performing equalization and channel estimation on each tone-demapped output of a DFT.

The IDFT module 735 may be used to perform an IDFT on each equalized tone-demapped output, to recover a plurality of data modulation symbols and channel or interference estimation modulation symbols for each of the SC-FDM symbol streams. In some examples, the IDFT module 735 may recover channel or interference estimation modulation symbols corresponding to different users from different SC-FDM symbol streams, in accordance with user-specific insertion period offsets. In some examples, the channel or interference estimation modulation symbols may include zero symbols. In some examples, the channel or interference estimation modulation symbols may include known non-zero symbols. In some examples, the channel or interference estimation modulation symbols corresponding to an SC-FDM symbol stream (e.g., an SC-FDM symbol stream received from a particular user) may have a reduced modulation order with respect to the data modulation symbols corresponding to the SC-FDM symbol stream. In some examples, a same number of channel or interference estimation modulation symbols may be included in each SC-FDM symbol of the SC-FDM symbol stream.

The channel or interference estimation module 740 may be used to estimate interference (e.g., SNRs) based at least in part on the channel or interference estimation modulation symbols.

The decoding module 745 may be used to decode the data modulation symbols based at least in part on the estimated interference. In some examples, a first plurality of data modulation symbols within a first group of modulation symbols corresponding to a first SC-FDM symbol stream may be decoded based at least in part on interference estimated for a first plurality of channel or interference estimation modulation symbols within a second group of modulation symbols corresponding to a second SC-FDM symbol stream.

Figure 8:
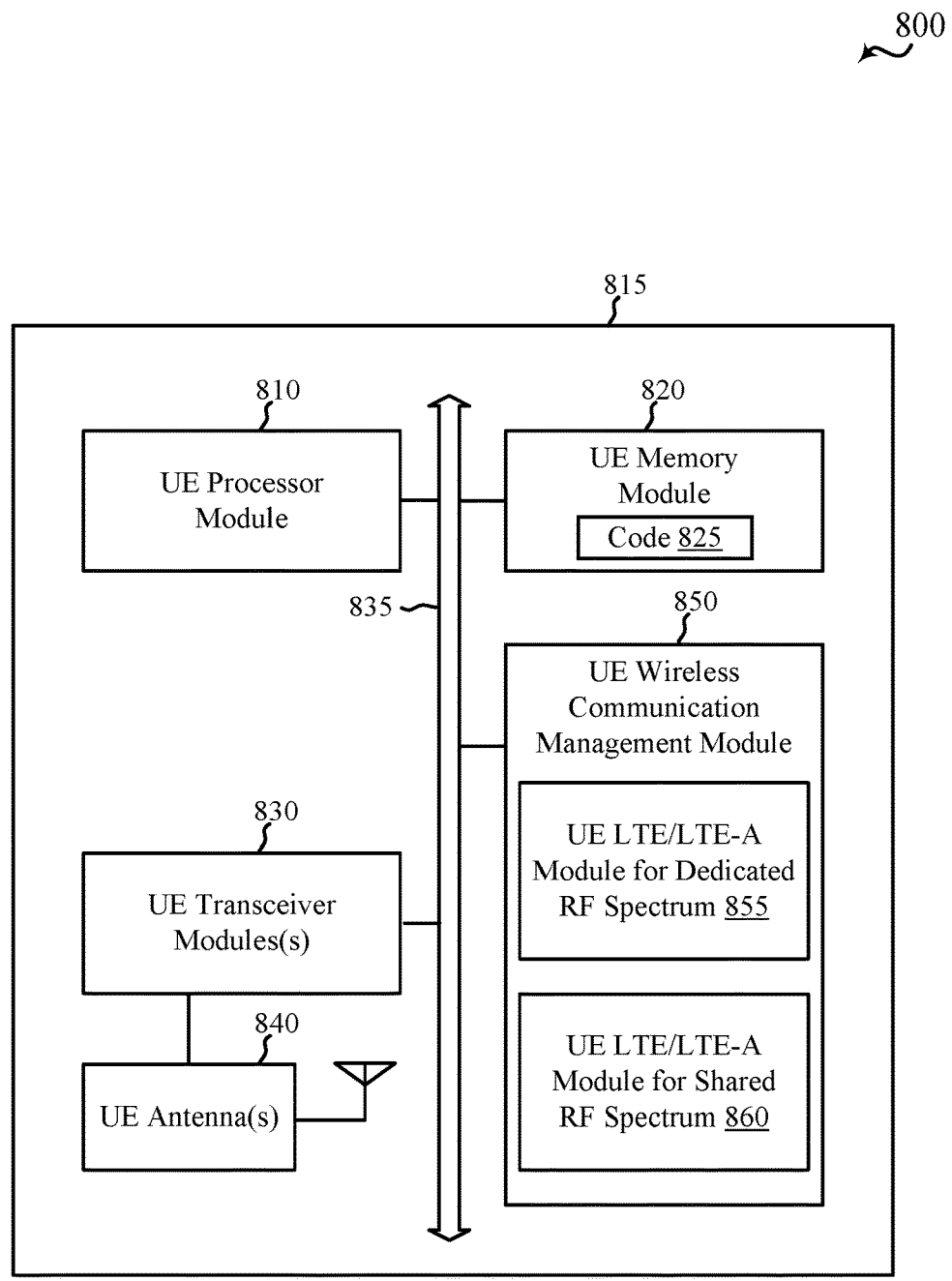
FIG. 8 shows a block diagram of a UE for use in wireless communication, in accordance with various aspects of the present disclosure.

FIG. 8 shows a block diagram 800 of a UE 815 for use in wireless communication, in accordance with various aspects of the present disclosure. The UE 815 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 815 may, in some examples, have an internal power supply (not shown), such as a small battery, to facilitate mobile operation. In some examples, the UE 815 may be an example of aspects of one or more of the UEs 115, 215, 215-a, 215-b, 215-c, or 815 described with reference to FIG. 1, 2, or 8, aspects of the transmitter 315 described with reference to FIG. 3, or aspects of one or more of the apparatuses 415 or 515 described with reference to FIG. 4 or 5. The UE 815 may be configured to implement at least some of the UE or apparatus features and functions described with reference to FIG. 1, 2, 3, 4, or 5.

The UE 815 may include a UE processor module 810, a UE memory module 820, at least one UE transceiver module (represented by UE transceiver module(s) 830), at least one UE antenna (represented by UE antenna(s) 840), or a UE wireless communication management module 850. Each of these components may be in communication with each other, directly or indirectly, over one or more buses 835.

The UE memory module 820 may include random access memory (RAM) or read-only memory (ROM). The UE memory module 820 may store computer-readable, computer-executable code 825 containing instructions that are configured to, when executed, cause the UE processor module 810 to perform various functions described herein related to wireless communication, including the insertion of channel or interference estimation modulation symbols into a sequence of data modulation symbols. Alternatively, the code 825 may not be directly executable by the UE processor module 810 but be configured to cause the UE 815 (e.g., when compiled and executed) to perform various of the functions described herein.

The UE processor module 810 may include an intelligent hardware device, e.g., a central processing unit (CPU), a microcontroller, an ASIC, etc. The UE processor module 810 may process information received through the UE transceiver module(s) 830 or information to be sent to the UE transceiver module(s) 830 for transmission through the UE antenna(s) 840. The UE processor module 810 may handle, alone or in connection with the UE wireless communication management module 850, various aspects of communicating over (or managing communications over) a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may contend for access (e.g., a radio frequency spectrum that is available for unlicensed use, such as Wi-Fi use, or a radio frequency spectrum that is available for use by multiple operators in an equally shared or prioritized manner).

The UE transceiver module(s) 830 may include a modem configured to modulate packets and provide the modulated packets to the UE antenna(s) 840 for transmission, and to demodulate packets received from the UE antenna(s) 840. The UE transceiver module(s) 830 may, in some examples, be implemented as one or more UE transmitter modules and one or more separate UE receiver modules. The UE transceiver module(s) 830 may support communications in the dedicated radio frequency spectrum or the shared radio frequency spectrum. The UE transceiver module(s) 830 may be configured to communicate bi-directionally, via the UE antenna(s) 840, with one or more of the base stations 105, 205, or 205-a described with reference to FIG. 1 or 2, aspects of the receiver 305 described with reference to FIG. 3, or aspects of one or more of the apparatuses 605 or 705 described with reference to FIG. 6 or 7. While the UE 815 may include a single UE antenna, there may be examples in which the UE 815 may include multiple UE antennas 840.

The UE wireless communication management module 850 may be configured to perform or control some or all of the UE or apparatus features or functions described with reference to FIG. 1, 2, 3, 4, or 5 related to wireless communication over the dedicated radio frequency spectrum or the shared radio frequency spectrum. For example, the UE wireless communication management module 850 may be configured to support a supplemental downlink mode (e.g., a licensed assisted access mode), a carrier aggregation mode, or a standalone mode using the dedicated radio frequency spectrum or the shared radio frequency spectrum. The UE wireless communication management module 850 may include a UE LTE/LTE-A module for dedicated RF spectrum 855 configured to handle LTE/LTE-A communications in the dedicated radio frequency spectrum, and a UE LTE/LTE-A module for shared RF spectrum 860 configured to handle LTE/LTE-A communications in the shared radio frequency spectrum. The UE wireless communication management module 850, or portions of it, may include a processor, or some or all of the functions of the UE wireless communication management module 850 may be performed by the UE processor module 810 or in connection with the UE processor module 810. In some examples, the UE wireless communication management module 850 may be an example of the wireless communication management module 420 or 520 described with reference to FIG. 4 or 5.

Figure 9:
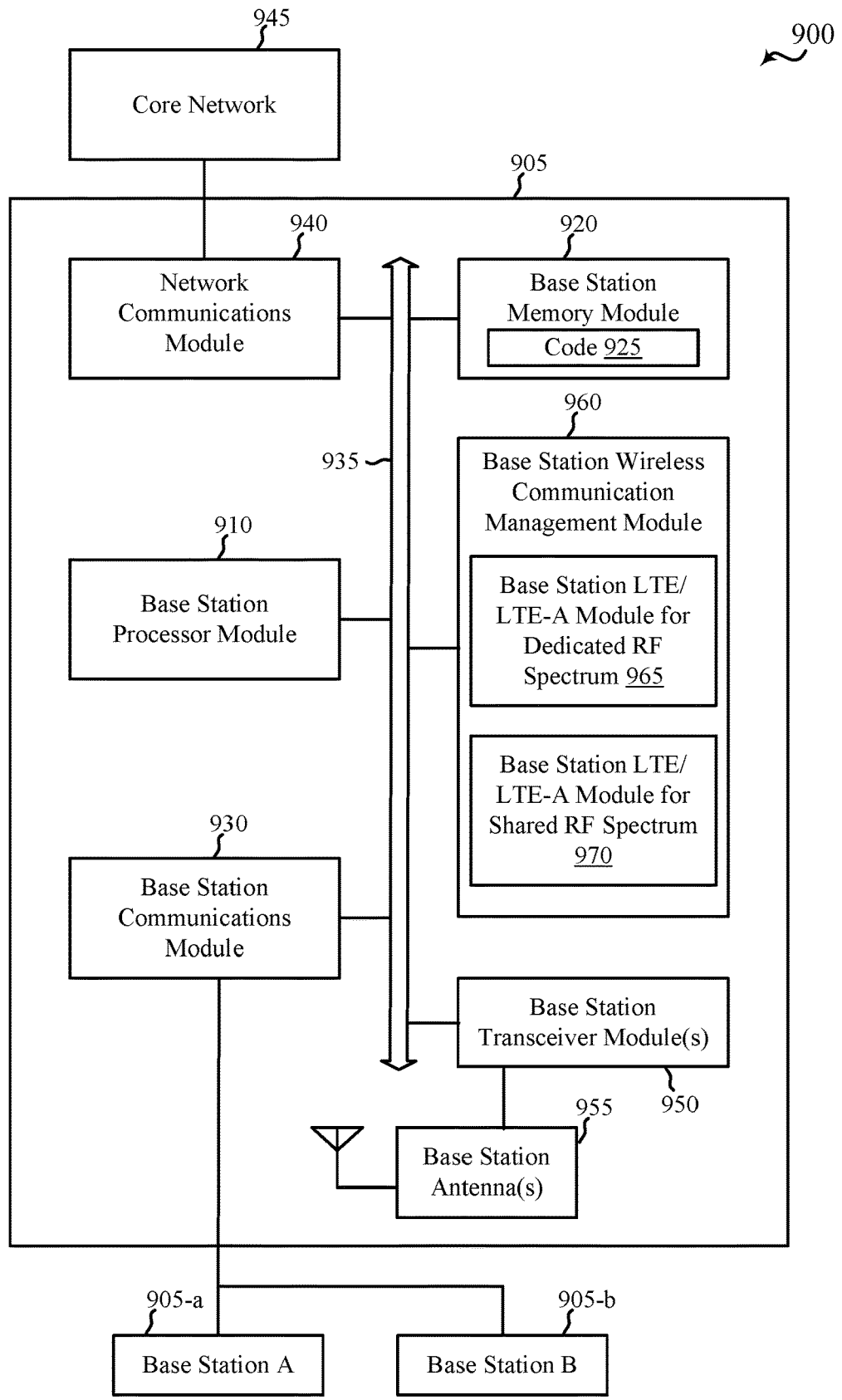
FIG. 9 shows a block diagram of a base station (e.g., a base station forming part or all of an eNB) for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of one or more aspects of the base station 105, 205, or 205-a described with reference to FIG. 1 or 2, aspects of the receiver 305 described with reference to FIG. 3, or aspects of one or more of the apparatuses 605 or 705 described with reference to FIG. 6 or 7. The base station 905 may be configured to implement or facilitate at least some of the base station features and functions described with reference to FIG. 1, 2, 3, 6, or 7.

The base station 905 may include a base station processor module 910, a base station memory module 920, at least one base station transceiver module (represented by base station transceiver module(s) 950), at least one base station antenna (represented by base station antenna(s) 955), or a base station wireless communication management module 960. The base station 905 may also include one or more of a base station communications module 930 or a network communications module 940. Each of these components may be in communication with each other, directly or indirectly, over one or more buses 935.

The base station memory module 920 may include RAM or ROM. The base station memory module 920 may store computer-readable, computer-executable code 925 containing instructions that are configured to, when executed, cause the base station processor module 910 to perform various functions described herein related to wireless communication, including the recovery of channel or interference estimation modulation symbols, the estimation of interference based at least in part on the channel or interference estimation modulation symbols, and the decoding of data modulation symbols based at least in part on the estimated interference. Alternatively, the code 925 may not be directly executable by the base station processor module 910 but be configured to cause the base station 905 (e.g., when compiled and executed) to perform various of the functions described herein.

The base station processor module 910 may include an intelligent hardware device, e.g., a CPU, a microcontroller, an ASIC, etc. The base station processor module 910 may process information received through the base station transceiver module(s) 950, the base station communications module 930, or the network communications module 940. The base station processor module 910 may also process information to be sent to the transceiver module(s) 950 for transmission through the antenna(s) 955, to the base station communications module 930, for transmission to one or more other base stations 905-a and 905-b, or to the network communications module 940 for transmission to a core network 945, which may be an example of one or more aspects of the core network 130 described with reference to FIG. 1. The base station processor module 910 may handle, alone or in connection with the base station wireless communication management module 960, various aspects of communicating over (or managing communications over) a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may contend for access (e.g., a radio frequency spectrum that is available for unlicensed use, such as Wi-Fi use, or a radio frequency spectrum that is available for use by multiple operators in an equally shared or prioritized manner).

The base station transceiver module(s) 950 may include a modem configured to modulate packets and provide the modulated packets to the base station antenna(s) 955 for transmission, and to demodulate packets received from the base station antenna(s) 955. The base station transceiver module(s) 950 may, in some examples, be implemented as one or more base station transmitter modules and one or more separate base station receiver modules. The base station transceiver module(s) 950 may support communications in the dedicated radio frequency spectrum or the shared radio frequency spectrum. The base station transceiver module(s) 950 may be configured to communicate bi-directionally, via the antenna(s) 955, with one or more UEs or apparatuses, such as one or more of the UEs 115, 215, 215-a, 215-b, 215-c, or 815 described with reference to FIG. 1, 2, or 8, aspects of the transmitter 315 described with reference to FIG. 3, or one or more of the apparatuses 415 or 515 described with reference to FIG. 4 or 5. The base station 905 may, for example, include multiple base station antennas 955 (e.g., an antenna array). The base station 905 may communicate with the core network 945 through the network communications module 940. The base station 905 may also communicate with other base stations, such as the base stations 905-a and 905-b, using the base station communications module 930.

The base station wireless communication management module 960 may be configured to perform or control some or all of the features or functions described with reference to FIG. 1, 2, 3, 6, or 7 related to wireless communication over the dedicated radio frequency spectrum or the shared radio frequency spectrum. For example, the base station wireless communication management module 960 may be configured to support a supplemental downlink mode (e.g., a licensed assisted access mode), a carrier aggregation mode, or a standalone mode using the dedicated radio frequency spectrum or the shared radio frequency spectrum. The base station wireless communication management module 960 may include a base station LTE/LTE-A module for dedicated RF spectrum 965 configured to handle LTE/LTE-A communications in the dedicated radio frequency spectrum, and a base station LTE/LTE-A module for shared RF spectrum 970 configured to handle LTE/LTE-A communications in the shared radio frequency spectrum. The base station wireless communication management module 960, or portions of it, may include a processor, or some or all of the functions of the base station wireless communication management module 960 may be performed by the base station processor module 910 or in connection with the base station processor module 910. In some examples, the base station wireless communication management module 960 may be an example of the wireless communication management module 620 or 720 described with reference to FIG. 6 or 7.

Figure 10:
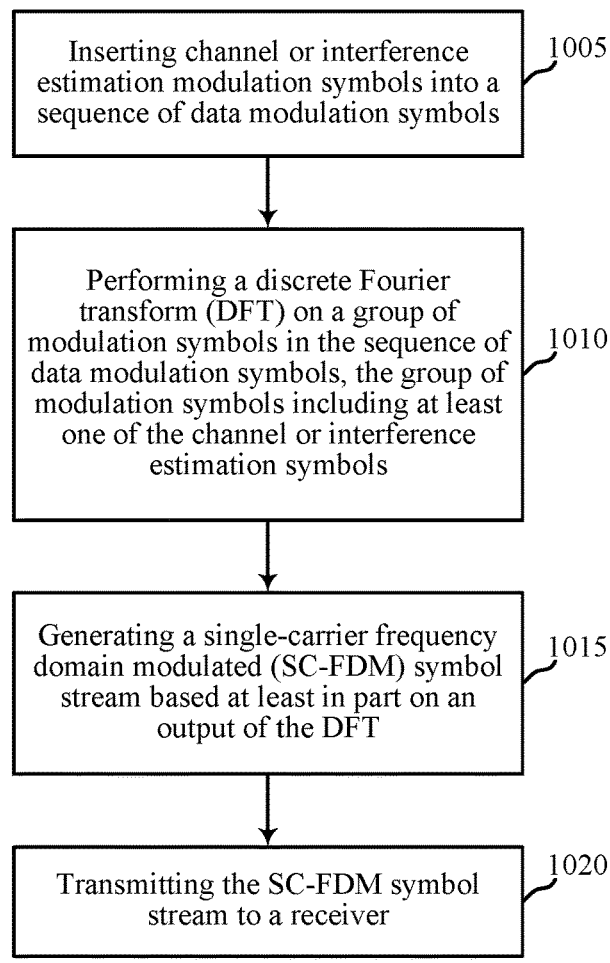
FIG. 10 is a flow chart illustrating an exemplary method for wireless communication, in accordance with various aspects of the present disclosure.

FIG. 10 is a flow chart illustrating an exemplary method 1000 for wireless communication, in accordance with various aspects of the present disclosure. For clarity, the method 1000 is described below with reference to aspects of one or more of the UEs 115, 215, 215-a, 215-b, 215-c, or 815 described with reference to FIG. 1, 2, or 8, or aspects of the transmitter 315 described with reference to FIG. 3, or aspects of one or more of the apparatuses 415 or 515 described with reference to FIG. 4 or 5. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1005, the method 1000 may include inserting channel or interference estimation estimation modulation symbols into a sequence of data modulation symbols. In some examples, data modulation symbols in the sequence of data modulation symbols may be rate-matched to the channel or interference estimation modulation symbols. The operation(s) at block 1005 may be performed using the wireless communication management module 420, 520, or 850 described with reference to FIG. 4, 5, or 8, or the channel or interference estimation modulation symbol insertion module 435 or 535 described with reference to FIG. 4 or 5.

In some examples of the method 1000, the channel or interference estimation modulation symbols may include zero symbols. In some examples, the channel or interference estimation modulation symbols may include known non-zero symbols. In some examples, the channel or interference estimation modulation symbols may have a reduced modulation order with respect to the data modulation symbols.

At block 1010, the method 1000 may include performing a DFT on a group of modulation symbols in the sequence of data modulation symbols. The group of modulation symbols may include at least one of the channel or interference estimation modulation symbols. The operation(s) at block 1010 may be performed using the wireless communication management module 420, 520, or 850 described with reference to FIG. 4, 5, or 8, or the DFT module 440 or 540 described with reference to FIG. 4 or 5.

At block 1015, the method 1000 may include generating a SC-FDM symbol stream based at least in part on an output of the DFT. In some examples, generating the SC-FDM symbol stream may include performing a tone mapping based at least in part on the output of the DFT, and performing an IFFT on an output of the tone mapping. The operation(s) at block 1015 may be performed using the wireless communication management module 420, 520, or 850 described with reference to FIG. 4, 5, or 8, or the SC-FDM symbol stream generation module 445 or 545 described with reference to FIG. 4 or 5.

At block 1020, the SC-FDM symbol stream may be transmitted to a receiver (e.g., the SC-FDM symbol stream may be transmitted on an uplink channel, to a base station). In some examples, the SC-FDM symbol stream may be transmitted over a shared radio frequency spectrum (e.g., a radio frequency spectrum that is available for unlicensed use, such as Wi-Fi use, or a radio frequency spectrum that is available for use by multiple operators in an equally shared or prioritized manner).

In some examples of the method 1000, the channel or interference estimation modulation symbols may span all frequencies within a number of resource blocks allocated for the SC-FDM symbol stream. In some examples, a same number of channel or interference estimation modulation symbols may be included in each SC-FDM symbol of the SC-FDM symbol stream.

Thus, the method 1000 may provide for wireless communication. It should be noted that the method 1000 is just one implementation and that the operations of the method 1000 may be rearranged or otherwise modified such that other implementations are possible.

Figure 11:
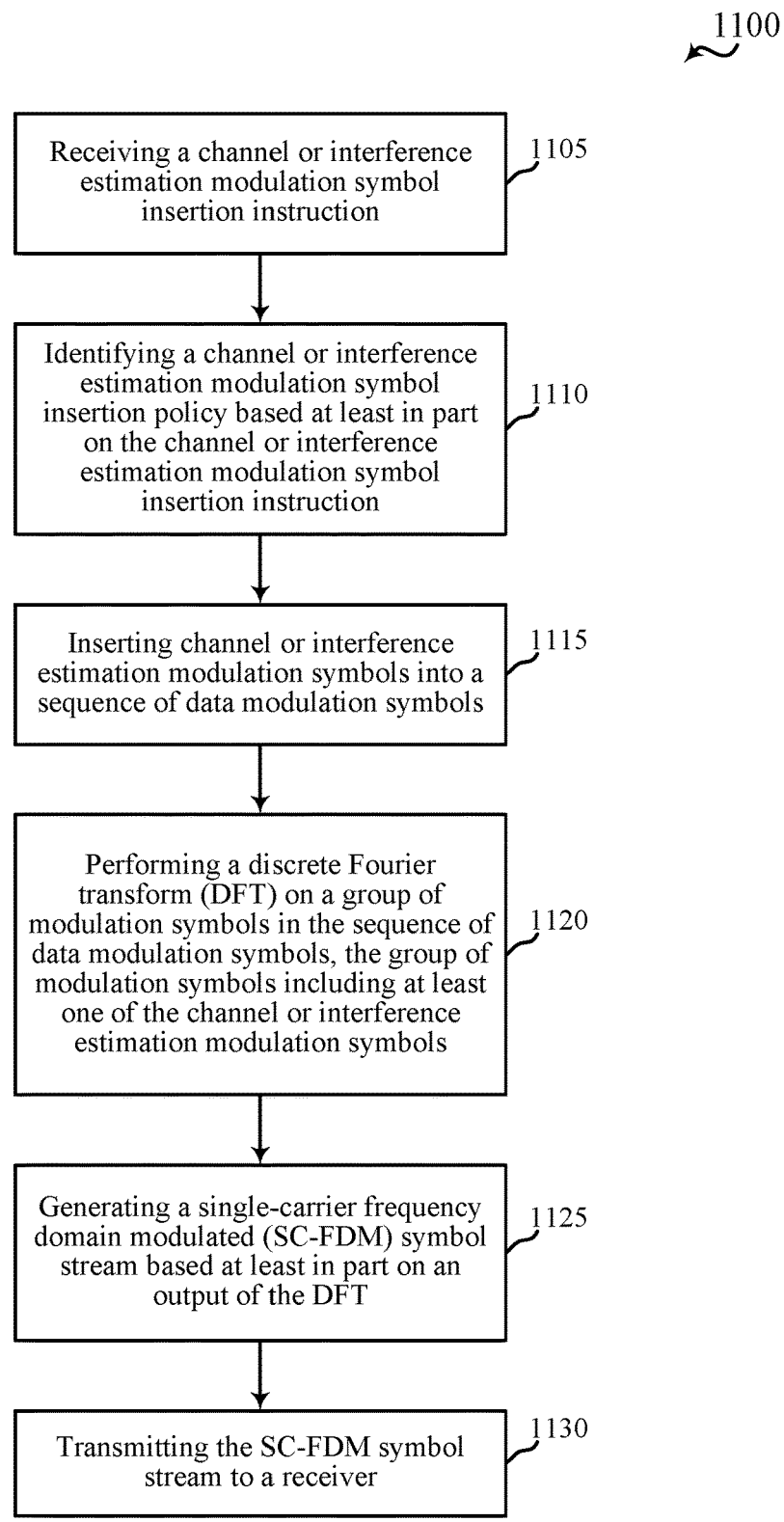
FIG. 11 is a flow chart illustrating an exemplary method for wireless communication, in accordance with various aspects of the present disclosure.

FIG. 11 is a flow chart illustrating an exemplary method 1100 for wireless communication, in accordance with various aspects of the present disclosure. For clarity, the method 1100 is described below with reference to aspects of one or more of the UEs 115, 215, 215-*a*, 215-*b*, 215-*c*, or 815 described with reference to FIG. 1, 2, or 8, aspects of the transmitter 315 described with reference to FIG. 3, or aspects of one or more of the apparatuses 415 or 515 described with reference to FIG. 4 or 5. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1105, the method 1100 may include receiving a channel or interference estimation modulation symbol insertion instruction (e.g., from a base station). In some examples, the channel or interference estimation modulation symbol insertion instruction may be received in connection with a transmission grant (e.g., an uplink grant) from the base station, or in connection with control signaling of the base station. The channel or interference estimation modulation symbol insertion instruction may include a semi-static instruction or a dynamic instruction. The operation(s) at block 1105 may be performed using the wireless communication management module 420, 520, or 850 described with reference to FIG. 4, 5, or 8, or the insertion instruction processing module 550 described with reference to FIG. 5.

At block 1110, the method 1100 may optionally include identifying a channel or interference estimation modulation symbol insertion policy based at least in part on the channel or interference estimation modulation symbol insertion instruction. The operation(s) at block 1110 may also include determining a user-specific (e.g., UE-specific) insertion period offset for inserting the channel or interference estimation modulation symbols. In some examples, the user-specific insertion period offset may be identified by the channel or interference estimation modulation symbol insertion policy. The operation(s) at block 1110 may be performed using the wireless communication management module 420, 520, or 850 described with reference to FIG. 4, 5, or 8, or the insertion policy identification module 555 described with reference to FIG. 5.

At block 1115, the method 1100 may include inserting channel or interference estimation modulation symbols into a sequence of data modulation symbols. The channel or interference estimation modulation symbols may be inserted into the sequence of data modulation symbols in accordance with the insertion instruction received at block 1105 and/or the insertion policy or user-specific insertion period offset identified at block 1110. In some examples, data modulation symbols in the sequence of data modulation symbols may be rate-matched to the channel or interference estimation modulation symbols. The operation(s) at block 1115 may be performed using the wireless communication management module 420, 520, or 850 described with reference to FIG. 4, 5, or 8, or the channel or interference estimation modulation symbol insertion module 435 or 535 described with reference to FIG. 4 or 5.

In some examples of the method 1100, the channel or interference estimation modulation symbols may include zero symbols. In some examples, the channel or interference estimation modulation symbols may include known non-zero symbols. In some examples, the channel or interference estimation modulation symbols may have a reduced modulation order with respect to the data modulation symbols.

At block 1120, the method 1100 may include performing a DFT on a group of modulation symbols in the sequence of data modulation symbols. The group of modulation symbols may include at least one of the channel or interference estimation modulation symbols. The operation(s) at block 1120 may be performed using the wireless communication management module 420, 520, or 850 described with reference to FIG. 4, 5, or 8, or the DFT module 440 or 540 described with reference to FIG. 4 or 5.

At block 1125, the method 1100 may include generating a SC-FDM symbol stream based at least in part on an output of the DFT. In some examples, generating the SC-FDM symbol stream may include performing a tone mapping based at least in part on the output of the DFT, and performing an IFFT on an output of the tone mapping. The operation(s) at block 1125 may be performed using the wireless communication management module 420, 520, or 850 described with reference to FIG. 4, 5, or 8, or the SC-FDM symbol stream generation module 445 or 545 described with reference to FIG. 4 or 5.

At block 1130, the SC-FDM symbol stream may be transmitted to a receiver (e.g., the SC-FDM symbol stream may be transmitted on an uplink channel, to a base station). In some examples, the SC-FDM symbol stream may be transmitted over a shared radio frequency spectrum (e.g., a radio frequency spectrum that is available for unlicensed use, such as Wi-Fi use, or a radio frequency spectrum that is available for use by multiple operators in an equally shared or prioritized manner).

In some examples of the method 1100, the channel or interference estimation modulation symbols may span all frequencies within a number of resource blocks allocated for the SC-FDM symbol stream. In some examples, a same number of channel or interference estimation modulation symbols may be included in each SC-FDM symbol of the SC-FDM symbol stream.

Thus, the method 1100 may provide for wireless communication. It should be noted that the method 1100 is just one implementation and that the operations of the method 1100 may be rearranged or otherwise modified such that other implementations are possible.

Figure 12:
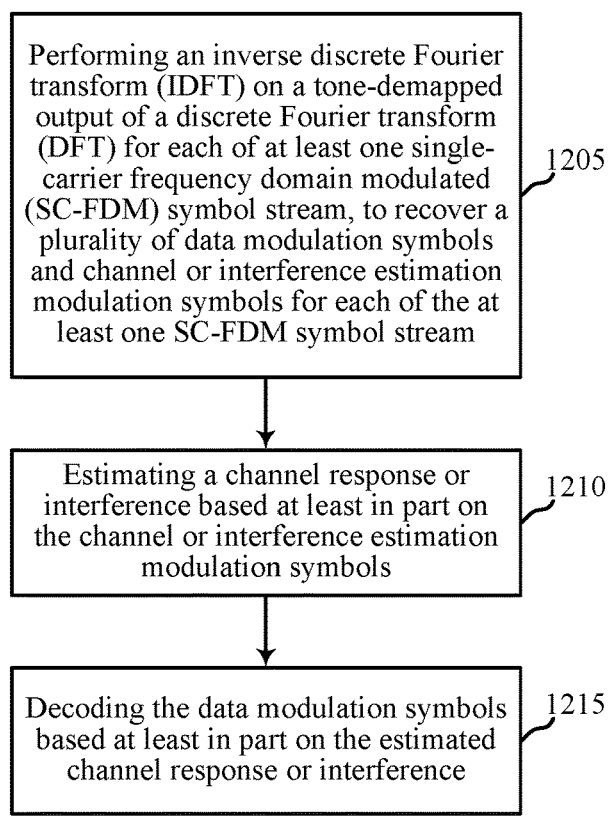
FIG. 12 is a flow chart illustrating an exemplary method for wireless communication, in accordance with various aspects of the present disclosure.

FIG. 12 is a flow chart illustrating an exemplary method 1200 for wireless communication, in accordance with various aspects of the present disclosure. For clarity, the method 1200 is described below with reference to aspects of one or more of the base stations 105, 205, 205-*a*, or 905 described with reference to FIG. 1, 2, or 9, aspects of the receiver 305 described with reference to FIG. 3, or aspects of one or more of the apparatuses 705 or 805 described with reference to FIG. 7 or 8. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1205, the method 1200 may include performing an IDFT on a tone-demapped output of a DFT for each of at least one SC-FDM symbol stream, to recover a plurality of data modulation symbols and channel or interference estimation modulation symbols for each of the at least one SC-FDM symbol stream. The operation(s) at block 1205 may be performed using the wireless communication management module 620, 720, or 960 described with reference to FIG. 6, 7, or 9, or the IDFT module 635 or 735 described with reference to FIG. 6 or 7.

In some examples of the method 1200, the channel or interference estimation modulation symbols may include zero symbols. In some examples, the channel or interference estimation modulation symbols may include known non-zero symbols. In some examples, the channel or interference estimation modulation symbols corresponding to a SC-FDM symbol stream (e.g., a SC-FDM symbol stream received from a particular user) may have a reduced modulation order with respect to the data modulation symbols corresponding to the SC-FDM symbol stream. In some examples, a same number of channel or interference estimation modulation symbols may be included in each SC-FDM symbol of the SC-FDM symbol stream.

At block 1210, the method 1200 may include estimating a channel response or interference (e.g., at least one SNR) based at least in part on the channel or interference estimation modulation symbols. The operation(s) at block 1210 may be performed using the wireless communication management module 620, 720, or 960 described with reference to FIG. 6, 7, or 9, or the channel or interference estimation module 640 or 740 described with reference to FIG. 6 or 7.

At block 1215, the method 1200 may include decoding the data modulation symbols based at least in part on the estimated channel response or interference. The operation(s) at block 1215 may be performed using the wireless communication management module 620, 720, or 960 described with reference to FIG. 6, 7, or 9, or the decoding module 645 or 745 described with reference to FIG. 6 or 7.

Thus, the method 1200 may provide for wireless communication. It should be noted that the method 1200 is just one implementation and that the operations of the method 1200 may be rearranged or otherwise modified such that other implementations are possible.

Figure 13:
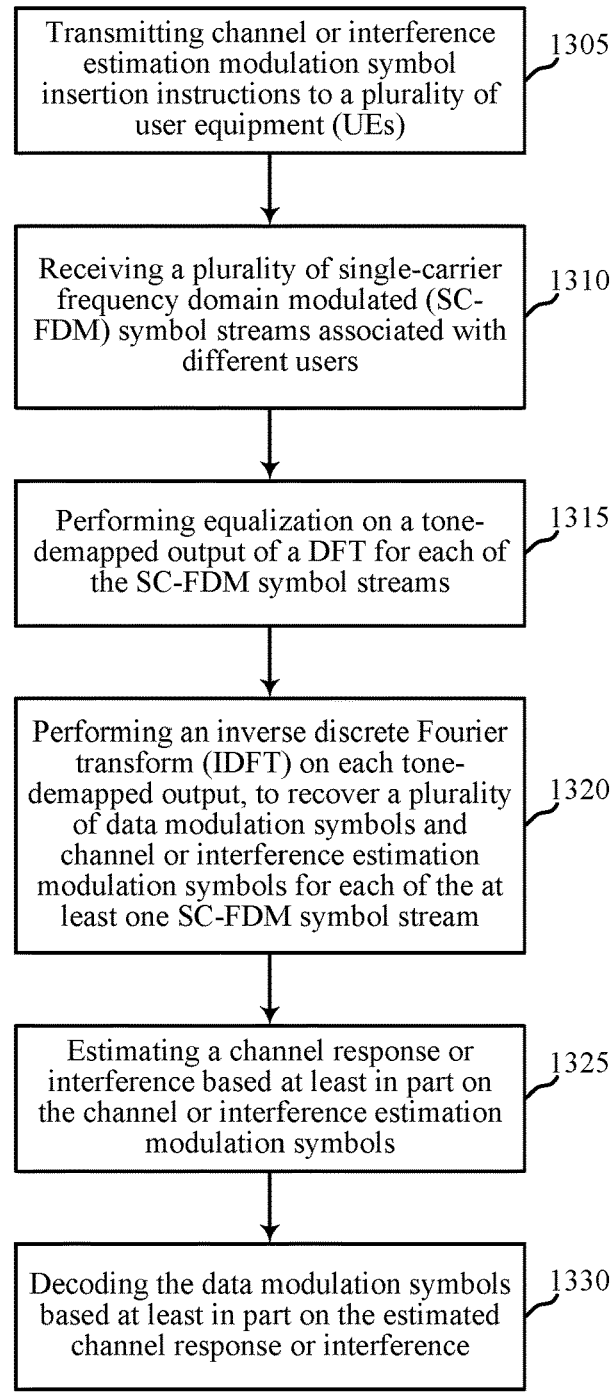
FIG. 13 is a flow chart illustrating an exemplary method for wireless communication, in accordance with various aspects of the present disclosure.

FIG. 13 is a flow chart illustrating an exemplary method 1300 for wireless communication, in accordance with various aspects of the present disclosure. For clarity, the method 1300 is described below with reference to aspects of one or more of the base stations 105, 205, 205-*a*, or 905 described with reference to FIG. 1, 2, or 9, aspects of the receiver 305 described with reference to FIG. 3, or aspects of one or more of the apparatuses 705 or 805 described with reference to FIG. 7 or 8. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1305, the method 1300 may include transmitting channel or interference estimation modulation symbol insertion instructions to a plurality of UEs. In some examples, the channel or interference estimation modulation symbol insertion instructions may be transmitted in connection with transmission grants (e.g., uplink grants) transmitted to the UEs, or in connection with control signaling transmitted to the UEs. A channel or interference estimation modulation symbol insertion instruction may include a semi-static instruction or a dynamic instruction. The operation(s) at block 1305 may be performed using the wireless communication management module 620, 720, or 960 described with reference to FIG. 6, 7, or 9, or the insertion instruction transmission module 750 described with reference to FIG. 7.

At block 1310, the method 1300 may include receiving a plurality of SC-FDM symbol streams associated with different users (e.g., different UEs). In some examples, the SC-FDM symbol streams may be received on an uplink channel. In some examples, the SC-FDM symbol stream may be received over a shared radio frequency spectrum (e.g., a radio frequency spectrum that is available for unlicensed use, such as Wi-Fi use, or a radio frequency spectrum that is available for use by multiple operators in an equally shared or prioritized manner). The operation(s) at block 1310 may be performed using the wireless communication management module 620, 720, or 960 described with reference to FIG. 6, 7, or 9, or the SC-FDM symbol stream processing module 755 described with reference to FIG. 7.

At block 1315, the method 1300 may include performing equalization on a tone-demapped output of a DFT for each of the SC-FDM symbol streams. The operation(s) at block 1315 may be performed using the wireless communication management module 620, 720, or 960 described with reference to FIG. 6, 7, or 9, or the SC-FDM symbol stream processing module 760 described with reference to FIG. 7.

At block 1320, the method 1300 may include performing an IDFT on each equalized tone-demapped output, to recover a plurality of data modulation symbols and channel or interference estimation modulation symbols for each of the SC-FDM symbol streams. In some examples, the operation(s) at block 1320 may include recovering channel or interference estimation modulation symbols corresponding to different users from different SC-FDM symbol streams, in accordance with user-specific insertion period offsets. The operation(s) at block 1320 may be performed using the wireless communication management module 620, 720, or 960 described with reference to FIG. 6, 7, or 9, or the IDFT module 635 or 735 described with reference to FIG. 6 or 7.

In some examples of the method 1300, the channel or interference estimation modulation symbols may include zero symbols. In some examples, the channel or interference estimation modulation symbols may include known non-zero symbols. In some examples, the channel or interference estimation modulation symbols corresponding to a SC-FDM symbol stream (e.g., a SC-FDM symbol stream received from a particular user) may have a reduced modulation order with respect to the data modulation symbols corresponding to the SC-FDM symbol stream. In some examples, a same number of channel or interference estimation modulation symbols may be included in each SC-FDM symbol of the SC-FDM symbol stream.

At block 1325, the method 1300 may include estimating a channel response or interference (e.g., SNRs) based at least in part on the channel or interference estimation modulation symbols. The operation(s) at block 1325 may be performed using the wireless communication management module 620, 720, or 960 described with reference to FIG. 6, 7, or 9, or the interference estimation module 640 or 740 described with reference to FIG. 6 or 7.

At block 1330, the method 1300 may include decoding the data modulation symbols based at least in part on the estimated channel response or interference. In some examples, a first plurality of data modulation symbols within a first group of modulation symbols corresponding to a first SC-FDM symbol stream may be decoded based at least in part on interference estimated for a first plurality of channel or interference estimation modulation symbols within a second group of modulation symbols corresponding to a second SC-FDM symbol stream. The operation(s) at block 1330 may be performed using the wireless communication management module 620, 720, or 960 described with reference to FIG. 6, 7, or 9, or the decoding module 645 or 745 described with reference to FIG. 6 or 7.

Thus, the method 1300 may provide for wireless communication. It should be noted that the method 1300 is just one implementation and that the operations of the method 1300 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a user equipment (UE), comprising:
   receiving, at a receiver of the UE and from a base station, a channel or interference estimation modulation symbol insertion instruction for the UE to insert channel or interference estimation modulation symbols into a sequence of data modulation symbols at particular locations in the sequence;
   determining a user-specific insertion period offset for the UE based at least in part on the received insertion instruction, wherein the user-specific insertion period offset is different from another user-specific insertion period offset for another UE;
   inserting the channel or interference estimation modulation symbols into the sequence of data modulation symbols in accordance with the user-specific insertion period offset and the received insertion instruction;
   performing a discrete Fourier transform (DFT) on a group of modulation symbols in the sequence of data modulation symbols, the group of modulation symbols including at least one of the channel or interference estimation modulation symbols; and
   generating a single-carrier frequency domain modulated (SC-FDM) symbol stream based at least in part on an output of the DFT.

2. The method of claim 1, wherein the channel or interference estimation modulation symbols comprise at least one of: zero symbols or known non-zero symbols.

3. The method of claim 1, wherein the channel or interference estimation modulation symbol insertion instruction is received in connection with a transmission grant from the base station.

4. The method of claim 1, wherein the channel or interference estimation modulation symbol insertion instruction comprises a semi-static instruction.

5. The method of claim 1, further comprising:
   identifying a channel or interference estimation modulation symbol insertion policy based at least in part on the channel or interference estimation modulation symbol insertion instruction.

6. The method of claim 1, wherein the channel or interference estimation modulation symbols have a reduced modulation order with respect to the data modulation symbols.

7. The method of claim 1, wherein each of the channel or interference estimation modulation symbols spans all frequencies within a number of resource blocks allocated for the SC-FDM symbol stream.

8. The method of claim 1, wherein a same number of channel or interference estimation modulation symbols is included in each SC-FDM symbol of the SC-FDM symbol stream.

9. The method of claim 1, wherein data modulation symbols in the sequence of data modulation symbols are rate-matched to the channel or interference estimation modulation symbols.

10. The method of claim 9, wherein the rate-matching is adaptable and based at least in part on the sequence of data modulation symbols.

11. An apparatus for wireless communication at a user equipment (UE), comprising:
   a processor;
   memory in electronic communication with the processor; and
   instructions stored in the memory, the instructions being executable by the processor to:
      receive, at a receiver of the UE and from a base station, a channel or interference estimation modulation symbol insertion instruction for the UE to insert channel or interference estimation modulation symbols into a sequence of data modulation symbols at particular locations in the sequence;
      determine a user-specific insertion period offset for the UE based at least in part on the received insertion instruction, wherein the user-specific insertion period offset is different from another user-specific insertion period offset for another UE;

insert the channel or interference estimation modulation symbols into the sequence of data modulation symbols in accordance with the user-specific insertion period offset and the received insertion instruction;

perform a discrete Fourier transform (DFT) on a group of modulation symbols in the sequence of data modulation symbols, the group of modulation symbols including at least one of the channel or interference estimation modulation symbols; and generate a single-carrier frequency domain modulated (SC-FDM) symbol stream based at least in part on an output of the DFT.

12. The apparatus of claim 11, wherein the channel or interference estimation modulation symbols comprise at least one of: zero symbols or known non-zero symbols.

13. The apparatus of claim 11, wherein the channel or interference estimation modulation symbol insertion instruction is received in connection with a transmission grant from the base station.

14. The apparatus of claim 11, wherein the instructions are executable by the processor to:
identify a channel or interference estimation modulation symbol insertion policy based at least in part on the channel or interference estimation modulation symbol insertion instruction.

15. The apparatus of claim 11, wherein a same number of channel or interference estimation modulation symbols is included in each SC-FDM symbol of the SC-FDM symbol stream.

16. A method for wireless communication at a base station, comprising:
transmitting, from the base station, a channel or interference estimation modulation symbol insertion instruction to insert channel or interference estimation modulation symbols into a sequence of data modulation symbols at particular locations in the sequence;
receiving, at the base station, at least one single-carrier frequency domain modulated (SC-FDM) symbol stream from at least one user equipment (UE);
performing an inverse discrete Fourier transform (IDFT) on a tone-demapped output of a discrete Fourier transform (DFT) for each of the at least one SC-FDM symbol stream, to recover a plurality of data modulation symbols and channel or interference estimation modulation symbols for each of the at least one SC-FDM symbol stream, wherein the channel or interference estimation modulation symbols for a SC-FDM symbol stream are further recovered based at least in part on a user-specific insertion period offset for a UE from which the SC-FDM symbol stream is received, wherein the user-specific period offset for the UE from which the SC-FDM symbol is received is different from another user-specific insertion period offset for another UE, wherein the user-specific period offset for the UE is determined based at least in part on the transmitted insertion instruction, and wherein the plurality of data modulation symbols and channel or interference estimation modulation symbols are located in the symbol stream in accordance with the transmitted insertion instruction;
estimating interference based at least in part on the channel or interference estimation modulation symbols; and
decoding the data modulation symbols based at least in part on the estimated interference.

17. The method of claim 16, further comprising:
performing equalization on each tone-demapped output; wherein the IDFT is performed on each equalized tone-demapped output.

18. The method of claim 16, wherein the channel or interference estimation modulation symbols comprise at least one of: zero symbols or known non-zero symbols.

19. The method of claim 16, wherein the channel or interference estimation modulation symbols corresponding to an SC-FDM symbol stream have a reduced modulation order with respect to the data modulation symbols corresponding to the SC-FDM symbol stream.

20. The method of claim 16, wherein the at least one SC-FDM symbol stream comprises a plurality of SC-FDM symbol streams received from different UEs, and the channel or interference estimation modulation symbols corresponding to the different UEs are recovered from different SC-FDM symbol streams in accordance with different user-specific insertion period offsets.

21. The method of claim 16, wherein a first plurality of data modulation symbols within a first group of modulation symbols corresponding to a first SC-FDM symbol stream are decoded based at least in part on interference estimated for a first plurality of channel or interference estimation modulation symbols within a second group of modulation symbols corresponding to a second SC-FDM symbol stream.

22. An apparatus for wireless communication at a base station, comprising:
a processor;
memory in electronic communication with the processor; and
instructions stored in the memory, the instructions being executable by the processor to:
transmit, from the base station, a channel or interference estimation modulation symbol insertion instruction;
receive, at the base station, at least one single-carrier frequency domain modulated (SC-FDM) symbol stream from at least one user equipment (UE);
perform an inverse discrete Fourier transform (IDFT) on a tone-demapped output of a discrete Fourier transform (DFT) for each of the at least one SC-FDM symbol stream, to recover a plurality of data modulation symbols and channel or interference estimation modulation symbols for each of the at least one SC-FDM symbol stream, wherein the channel or interference estimation modulation symbols for a SC-FDM symbol stream are further recovered based at least in part on a user-specific insertion period offset for a UE from which the SC-FDM symbol stream is received, and wherein the user-specific period offset for the UE from which the SC-FDM symbol is received is different from another user-specific insertion period offset for another UE, wherein the user-specific period offset for the UE is determined based at least in part on the transmitted insertion instruction, and wherein the plurality of data modulation symbols and channel or interference estimation modulation symbols are located in the at least one symbol stream in accordance with the transmitted insertion instruction;
estimate interference based at least in part on the channel or interference estimation modulation symbols; and
decode the data modulation symbols based at least in part on the estimated interference.

23. The apparatus of claim 22, wherein the instructions are executable by the processor to:
perform equalization on each tone-demapped output;

wherein the IDFT is performed on each equalized tone-demapped output.

24. The apparatus of claim 22, wherein the channel or interference estimation modulation symbols comprise at least one of: zero symbols or known non-zero symbols.

25. The apparatus of claim 22, wherein the at least one SC-FDM symbol stream comprises a plurality of SC-FDM symbol streams received from different UEs, and the channel or interference estimation modulation symbols corresponding to the different UEs are recovered from different SC-FDM symbol streams in accordance with different user-specific insertion period offsets.

26. The apparatus of claim 22, wherein a first plurality of data modulation symbols within a first group of modulation symbols corresponding to a first SC-FDM symbol stream are decoded based at least in part on interference estimated for a first plurality of channel or interference estimation modulation symbols within a second group of modulation symbols corresponding to a second SC-FDM symbol stream.

27. The method of claim 16, wherein the channel or interference estimation modulation symbol insertion instruction is transmitted in connection with a transmission grant from the base station.

28. The apparatus of claim 22, wherein the instructions are executable by the processor to:
transmit the channel or interference estimation modulation symbol insertion instruction in connection with a transmission grant from the base station.

* * * * *